US008102096B2

(12) United States Patent
Makansi

(10) Patent No.: US 8,102,096 B2
(45) Date of Patent: Jan. 24, 2012

(54) CLOSELY SPACED ELECTRODES WITH A UNIFORM GAP

(75) Inventor: Tarek Makansi, Tucson, AZ (US)

(73) Assignee: Tempronics, Inc., Tucson, AZ (US)

( * ) Notice: Subject to any disclaimer, the term of this patent is extended or adjusted under 35 U.S.C. 154(b) by 427 days.

(21) Appl. No.: 12/376,254

(22) PCT Filed: Aug. 28, 2007

(86) PCT No.: PCT/US2007/077042
§ 371 (c)(1),
(2), (4) Date: Feb. 3, 2009

(87) PCT Pub. No.: WO2008/027928
PCT Pub. Date: Mar. 6, 2008

(65) Prior Publication Data
US 2009/0322221 A1   Dec. 31, 2009

Related U.S. Application Data

(60) Provisional application No. 60/841,262, filed on Aug. 30, 2006, provisional application No. 60/925,083, filed on Apr. 18, 2007.

(51) Int. Cl.
*H02N 3/00* (2006.01)
*F25B 21/02* (2006.01)
(52) U.S. Cl. ........ 310/306; 136/205; 136/253; 136/243; 62/3.1
(58) Field of Classification Search .................. 310/306; 136/205, 243, 253; 62/3.1
See application file for complete search history.

(56) References Cited

U.S. PATENT DOCUMENTS

| | | | | |
|---|---|---|---|---|
| 3,129,345 A | * | 4/1964 | Hatsopoulos et al. | 310/306 |
| 3,173,032 A | * | 3/1965 | Maynard | 310/306 |
| 3,217,189 A | * | 11/1965 | Bloss | 310/306 |

(Continued)

FOREIGN PATENT DOCUMENTS

EP   40 10 909   10/1991

(Continued)

OTHER PUBLICATIONS

"Analysis of Nanometer Vacuum Gap Formation in Thermo-Tunneling Devices", Enikov et al., Nanotechnology 19 (2008), Jan. 31, 2008.

(Continued)

*Primary Examiner* — Karl Tamai
(74) *Attorney, Agent, or Firm* — Hayes Soloway P.C.

(57) ABSTRACT

An improved design for maintaining separation between electrodes in tunneling, resonant tunneling, diode, thermionic, thermo-photovoltaic and other devices is disclosed. At least one electrode 1 is made from flexible material. A magnetic field B is present to combine with the current flowing in the flexible electrode 1 and generate a force or a thermal expansion force combined with a temperature distribution that counterbalances the electrostatic force or other attracting forces between the electrodes. The balancing of forces allows the separation and parallelism between the electrodes to be maintained at a very small spacing without requiring the use of multiple control systems, actuators, or other manipulating means, or spacers. The shape of one or both electrodes 1 is designed to maintain a constant separation over the entire overlapping area of the electrodes, or to minimize a central contact area. The end result is an electronic device that maintains two closely spaced parallel electrodes in stable equilibrium with a uniform gap therebetween over a large area in a simple configuration for simplified manufacturability and use to convert heat to electricity or electricity to cooling.

70 Claims, 24 Drawing Sheets

U.S. PATENT DOCUMENTS

| | | | |
|---|---|---|---|
| 4,343,993 | A | 8/1982 | Binnig et al. |
| 5,028,835 | A * | 7/1991 | Fitzpatrick ........................ 313/14 |
| 5,541,464 | A * | 7/1996 | Johnson et al. ................. 310/306 |
| 6,064,137 | A | 5/2000 | Cox |
| 6,494,048 | B1 | 12/2002 | Ghoshal et al. ................... 62/3.7 |
| 6,651,760 | B2 | 11/2003 | Cox et al. |
| 6,720,704 | B1 | 4/2004 | Tavkhelidze et al. |
| 6,774,003 | B2 | 8/2004 | Tavkhelidze et al. |
| 6,876,123 | B2 | 4/2005 | Martinovsky et al. |
| 6,884,732 | B2 | 4/2005 | Najafi et al. ..................... 438/713 |
| 6,946,596 | B2 * | 9/2005 | Kucherov et al. ............... 136/205 |
| 7,005,381 | B1 | 2/2006 | Cox et al. |
| 7,140,102 | B2 | 11/2006 | Taliashvili et al. |
| 7,253,549 | B2 | 8/2007 | Tavkhelidze et al. |
| 7,305,839 | B2 | 12/2007 | Weaver, Jr. |
| 7,456,543 | B2 | 11/2008 | Makansi ......................... 310/306 |
| 2001/0046749 | A1 | 11/2001 | Tavkhelidze et al. |
| 2002/0170172 | A1 | 11/2002 | Tavkhelidze et al. |
| 2003/0042819 | A1 | 3/2003 | Martinovsky et al. |
| 2003/0184188 | A1 * | 10/2003 | Kucherov et al. ............... 310/306 |
| 2004/0050415 | A1 | 3/2004 | Kucherov et al. |
| 2004/0195934 | A1 | 10/2004 | Tanielian |
| 2005/0050415 | A1 | 3/2005 | Anand et al. |
| 2005/0184603 | A1 | 8/2005 | Martsinovsky |
| 2005/0189871 | A1 | 9/2005 | Tavkhelidze et al. |
| 2006/0000226 | A1 | 1/2006 | Weaver, Jr. |
| 2006/0038290 | A1 | 2/2006 | Tavkhelidze et al. |
| 2006/0138896 | A1 | 6/2006 | Makansi |
| 2006/0162761 | A1 | 7/2006 | Tanielian |
| 2006/0180829 | A1 | 8/2006 | Martsinovsky |
| 2006/0192196 | A1 | 8/2006 | Tavkhelidze et al. |
| 2006/0207643 | A1 | 9/2006 | Weaver, Jr. |
| 2007/0023077 | A1 | 2/2007 | Tanielian |
| 2007/0033782 | A1 | 2/2007 | Taliashvili et al. |
| 2007/0056623 | A1 | 3/2007 | Tavkhelidze et al. |
| 2007/0069357 | A1 | 3/2007 | Weaver et al. |
| 2007/0137687 | A1 | 6/2007 | Tanielian |
| 2007/0295973 | A1 | 12/2007 | Jinbo et al. ......................... 257/88 |
| 2008/0017237 | A1 | 1/2008 | Bray et al. |
| 2008/0042163 | A1 | 2/2008 | Weaver, Jr. |
| 2008/0155981 | A1 | 7/2008 | Tanielian |
| 2009/0205695 | A1 | 8/2009 | Makansi ......................... 136/201 |
| 2009/0229648 | A1 | 9/2009 | Makansi ......................... 136/201 |
| 2009/0322221 | A1 * | 12/2009 | Makansi ......................... 313/523 |

FOREIGN PATENT DOCUMENTS

| | | |
|---|---|---|
| EP | 1 612 492 | 4/2006 |
| WO | WO 99/13562 | 3/1999 |

OTHER PUBLICATIONS

European Supplementary Search Report, issued Oct. 22, 2010, Appln. No. 077814511.7-2208 /2057659, PCT/US2007077042, (8 pgs).

International Search Report and Written Opinion, PCT/US09/69959, Mar. 15, 2010 (10 pgs).

International Search Report and Written Opinion, PCT/US07/60871, Jan. 22, 2007 (6 pgs).

Jangidze et al., "Electroplating of conformal electrodes for vacuum nanogap tunnel junction", Tbilisi State University, Chavchavadze Ave. 13, 0179 Tbilisi, Georgia, Nov. 2008, pp. 1-11.

European Supplementary Search Report, issued Oct. 12, 2010, Appln. No. 07756398.9-2208 /198425,PCT/US2007060871, (6 pgs).

International Preliminary Report on Patentability, PCT/US07/07042, Mar. 12, 2009 (5 pgs).

Official Action dated Apr. 7, 2011 issued in related U.S. Appl. No. 12/302,782 (16 pgs).

European Communication, issued May 27, 2011, Appln. No. 07 756 398.9-2208 (3 pgs).

European Communication, issued Jun. 1, 2011, Appln. No. 07 814 511.7-2208 (3 pgs).

"Analysis of Nanometer Vacuum Gap Formation in Thermo-Tunneling Devices", Enikov et al., Nanotechnology 19 (2008), Jan. 31, 2008.

International Search Report and Written Opinion issued in PCT/US07/77042, dated Sep. 5, 2008.

Refrigeration by Combined Tunneling and Thermionic Emission in Vacuum: Use of Nanometer Scale Design, Y. Hishinuma, T.H. Geballe, B.Y. Moyzhes, Applied Physics Letters, vol. 78, No. 17, Apr. 23, 2001, Abstract only.

Vacuum Thermionic Refrigeration with a Semiconductor Heterojunction Structure, Y. Hishinuna, T.H. Geballe, B.Y. Moyzhes, Applied Physics Letters, vol. 81, No. 22, Nov. 25, 2002, Abstract only.

Design and Characterization of Thin Film Microcoolers, Chris LaBounty, Ali Shakouri, John E. Bowers, Journal of Applied Physics, vol. 89, No. 7, Apr. 1, 2001, Abstract only.

Possible Cooling by Resonant Fowler-Nordheim Emission, A.N. Korotkov and K.K. Likharev, Applied Physics Letters, vol. 75, No. 16, Aug. 23, 1999, Abstract only.

Thermionic Refrigeration, G.D. Mahan, Journal of Applied Physics, vol. 76, No. 7, Oct. 1, 1994, Abstract only.

Multilayer Thermionic Refrigerator, G.D. Mahan, J.A. Sofao and M. Bartkoiwak, Journal of Applied Physics, vol. 83, No. 9, May 1, 1998, Abstract only.

Measurements of Cooling by Room Temperature Thermionic Emission Across a Nanometer Gap Y. Hishinuma, T.H. Geballe, B.Y. Moyzhes, T.W. Kenny, Journal of Applied Physics, vol. 94, No. 7, Oct. 1, 2003, Abstract only.

"Quantum, Cylic, and Particle-Exchange Heat Engines", Humphrey et al., Physica E29, 390-398, 2005.

*Efficiency of Refrigeration using Thermotunneling and Thermionic Emission in a Vacuum: Use of Nanometer Scale Design*, by Y.Hishinuna, T.H. Geballe, B.Y. Moyzhes, and T.W. Kenny, Applied Physics Letters, vol. 78, No. 17, Apr. 23, 2001.

*Micron-gap ThermoPhotoVoltaics (MTPV)*, by R. DiMatteo, P. Greiff, D. Seltzer, D. Meulenberg, E. Brown, E. Carlen, K. Kaiser, S. Finberg, H. Nguyen, J. Azarkevich, P. Baldasaro, J. Beausang, L. Danielson, M. Dashiell, D. DePoy, H. Ehsani, W. Topper, K. Rahner, R. Siergie, Thermophotovoltaic Generation of Electricity Sixth Conference, American Institute of Physics, 2004.

Thermal and electrical properties of Czochralski grown GeSi single crystals, by I. Yonenaga et. al. Journal of Physics and Chemistry of Solids 2001.

"Thermotunneling Based Cooling Systems for High Efficiency Buildings", by Marco Aimi, Mehmet Arik, James Bray, Thomas Gorczyca, Darryl Michael, and Stan Weaver General Electric Global Research Center, DOE Report Identifier DE-FC26-04NT42324, 2007.

"Selective Epitaxial Growth of SiGe on a SOI Substrate by Using Ultra-High-Vacuum Chemical Vapor Deposition", by H. Choi, J. Bae, D. Soh, and S. Hong, Journal of he Korean Physical Society, vol. 48, No. 4, Apr. 2006, pp. 648-652.

"Strain relaxation of SiGe islands on compliant oxide", by H. Yin et. al. Journal of Applied Physics, vol. 91, No. 12, Jun. 15, 2002.

"Complex Thermoelectric Materials", by G.J. Snyder and E. S. Tober, Nature Materials, vol. 7 Feb. 2008.

Substrate-mediated photoinduced chemical reactions on ultrathin metal films, V.P. Zhdanov, B. Kasemo, Department of Applied Physics, Apr. 19, 1999, Surface Science 432 (1999) L599-L603.

Bismuth Telluride (Bi2Te3) Nanowires: Synthesis by Cyclic Electrodeposition/Stripping, Thinning by Electrooxidation, and Electrical Power Generation, E.J. Menke et al, Langmuir 2006, 22, 10564-10574, Jun. 30, 2006.

Electronic Properties of Bismuth Nanowires, Stephen B. Cronin et al., Dept of Physics, Electrical Engineering and Computer Science, Chemistry and Francis Bitter Magnet Laboratory, Massachusetts Institute of Technology, Cambridge, MA 02139.

\* cited by examiner

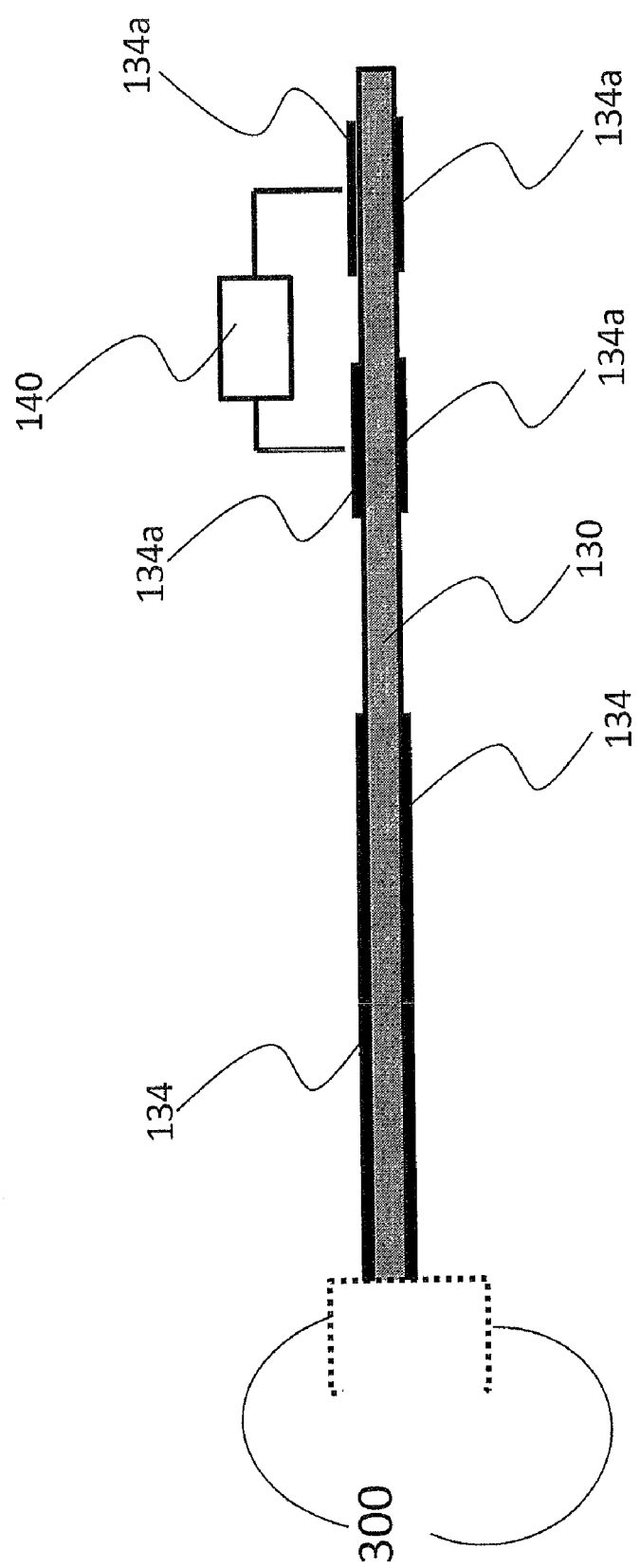

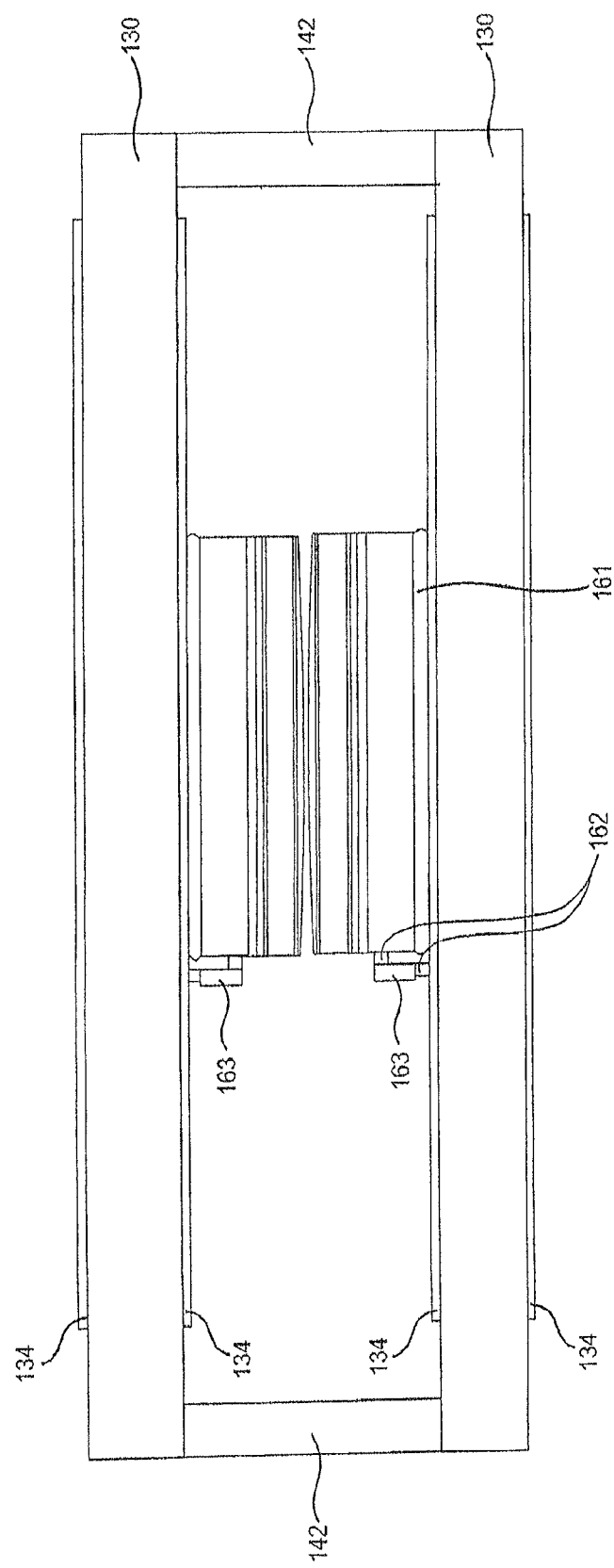

CLOSELY SPACED ELECTRODES WITH A UNIFORM GAP

The present invention pertains to diode, thermionic, tunneling, thermo-photovoltaic, thermoelectric, and other devices that are designed to have very small spacing between electrodes and in some cases also require thermal isolation between electrodes. The invention has particular application to thermo-tunneling and thermo-photovoltaic generators and heat pumps, and can be applied to similar systems using thermionic and thermoelectric methods. These tunneling generators and heat pumps convert thermal energy into electrical energy and can operate in reverse to provide refrigeration. The invention also may be applied to any device that requires close, parallel spacing of two electrodes with a current flowing between them.

The phenomenon of high-energy electron flow from one conductor (emitter) to another conductor (collector) has been used in many electronic devices and for a variety of purposes. For example, vacuum-tube diodes are implemented this way, and the physical phenomenon is called thermionic emission. Because of the limitations imposed by the relatively large physical spacing available, these diodes need to operate at a very high temperature (greater than 1000 degrees Kelvin). The hot electrode needs to be very hot for the electrons to gain enough energy to travel the large distance to the collector and overcome the high quantum barrier. Nevertheless, the vacuum tube permitted electronic diodes and later amplifiers to be built. Over time, these devices have been optimized, by using alkali metals, such as cesium, or oxides to coat the electrodes, in an effort to reduce operating temperatures. Although the temperatures for thermionic generation are still much higher than room temperature, this method of power generation has utility for conversion of heat from combustion or from solar concentrators to electricity.

More recently, it was discovered that if the emitter and the collector were very close to each other, on the order of atomic distances like 2 to 20 nanometers, then the electrons could flow at much lower temperatures, even at room temperature. At this small spacing, the electron clouds of the atoms of the two electrodes are so close that hot electrons actually flow from the emitter cloud to the collector cloud without physical conduction. This type of current flow when the electron clouds are intersecting, but the electrodes are not physically touching, is called tunneling. A scanning tunneling microscope, for example, uses a pointed, conducting stylus that is brought very close to a conducting surface, and the atomic contours of this surface can be mapped out by plotting the electrical current flow as the stylus is scanned across the surface. U.S. Pat. No. 4,343,993 (Binnig, et al.) teaches such a method applied to scanning tunneling microscopy.

It has been known in the industry that if such atomic separations could be maintained over a large area (one square centimeter, for example), then a significant amount of heat could be converted to electricity by a diode-like device and such device would have utility as refrigerators or in recovering wasted heat energy from a variety of sources. See *Efficiency of Refrigeration using Thermotunneling and Thermionic Emission in a Vacuum: Use of Nanometer Scale Design*, by Y. Hishinuna, T. H. Geballe, B. Y. Moyzhes, and T. W. Kenny, Applied Physics Letters, Volume 78, No. 17, 23 Apr. 2001; *Vacuum Thermionic Refrigeration with a Semiconductor Heterojunction Structure*, by Y. Hishinuna, T. H. Geballe, B. Y. Moyzhes, Applied Physics Letters, Volume 81, No. 22, 25 Nov. 2002; and *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003. The spacing between the electrodes must be small enough to allow the "hot" electrons (those electrons with energy above the Fermi level) to flow, but not so close as to allow normal conduction (flow of electrons at or below the Fermi level). There is a workable range of separation distance between 2 and 20 nanometers that allows thousands of watts per square centimeter of conversion from electricity to refrigeration. See *Efficiency of Refrigeration using Thermotunneling and Thermionic Emission in a Vacuum: Use of Nanometer Scale Design*, by Y. Hishinuna, et al. supra. These references also suggest the advantage of a coating or monolayer of an alkali metal, or other material, on the emitting electrode in order to achieve a low work function in the transfer of electrons from one electrode to the other. This coating or monolayer further reduces the operating temperature and increases the efficiency of conversion.

Mahan showed that the theoretical efficiency of a thermionic refrigerator, using 29 electrodes with a work function of 0.7 eV and a cold temperature of 500 K, is higher than 80% of Carnot efficiency. See *Thermionic Refrigeration*, By G. D. Mahan, Journal of Applied Physics, Volume 76, No. 7, 1 Oct. 1994. By analogy a conversion 32 efficiency of the electron tunneling process is expected to also be a high fraction of Carnot efficiency. Carnot efficiency presents an upper boundary on the achievable efficiency of thermal energy conversion.

The maintenance of separation of the electrodes at atomic dimensions over a large area has been the single, most significant challenge in building devices that can remove heat from a conductor. A scanning tunneling microscope, for example, requires a special lab environment that is vibration free, and its operation is limited to an area of a few square nanometers. Even very recently, all measurements of cooling in a working apparatus have been limited to an area of a few square nanometers. See *Measurements of Cooling by Room Temperature Thermionic Emission Across a Nanometer Gap*, by Y. Hishinuma, et al.

A separation of electrodes at larger dimensions of about 100 nanometers can support conversion of heat to electricity using thermo-photovoltaic methods. In thermo-photovoltaic systems, photons tunnel across a gap. A heat source causes one photo-emissive electrode to radiate, and if a second photosensitive electrode is spaced much less than the radiation wavelength, then up to ten times the conversion power is possible versus standard photovoltaic systems. The heat source can be concentrated sunlight, fossil fuel burning, or other means. The photo-emissive electrode can be made of tungsten for example. The photosensitive electrode can be made of silicon, selenium, or indium gallium arsenide. For more information on thermo-photovoltaic methods, see *Micron-gap ThermoPhotoVoltaics (MTPV)*, by R. DiMatteo, P. Greiff, D. Seltzer, D. Meulenberg, E. Brown, E. Carlen, K. Kaiser, S. Finberg, H. Nguyen, J. Azarkevich, P. Baldasaro, J. Beausang, L. Danielson, M. Dashiell, D. DePoy, H. Ehsani, W. Topper, K. Rahner, R. Siergie, Thermophotovoltaic Generation of Electricity Sixth Conference, American Institute of Physics, 2004.

Another method for direct energy conversion and cooling is achieved with thermoelectric devices. These devices use materials that exhibit the Seebeck effect, wherein a difference in temperature generates a voltage between two junctions of dissimilar materials, or conversely exhibit the Peltier effect, wherein an applied voltage creates a temperature difference between these junctions. The voltage from the Seebeck effect is generally proportional to the temperature difference at the two junctions and the power of the heat transfer from the Peltier effect is proportional to the current flowing through the junctions. One persistent challenge with thermoelectric devices has been that the material between the junctions is a physical contact between the two electrodes. This contact causes an electrical short, limiting any benefit from the Seebeck effect, and generates a thermal short, limiting any benefit from the Peltier effect. A nanometer gap in the material between or at the junctions would solve this persistent problem by creating thermal isolation between the hot and cold sides of the device, thereby reducing the effect of the thermal short that limits the Peltier effect. Such a gap could also reduce the electrical short that limits the Seebeck effect. If this gap were a vacuum gap of the proper dimensions, then an even greater benefit would be attained. Some theoretical and experimental work illustrates that such a vacuum gap could allow these solid state devices to compete with compressors for cooling and compete with rotating machinery like gas turbines and steam turbines in converting heat to electricity.

Hence, there remains a need for a device, which cost-effectively and efficiently converts heat energy into electrical energy in a package that is convenient to use for both the heat source as input and the electrical circuits needing power as output. Abundant sources of heat, including waste heat, could easily become sources of electricity. Examples where employing such devices would help the environment, save money, or both, include:

(1) Conversion of the sun's heat and light into electricity more cost effectively than photovoltaic devices currently used. Many articles describe the use of high temperature thermionic emission to recycle thermal energy from solar collectors by using such heat conversion devices. See *Thermionic Refrigeration*, By G. D. Mahan, supra; and *Multilayer Thermionic Refrigerator*, By G. D. Mahan, J. A. Sofao and M. Bartkoiwak, Journal of Applied Physics, Volume 83, No. 9, 1 May, 1998. However such conversions could be less costly and more prevalent if tunneling were achieved at naturally occurring temperatures.

(2) Recovery of the heat generated by an internal combustion engine, like that used in automobile, back into useful motion. Some automobiles available today, called hybrid gas-electric automobiles, can use either electrical power or internal combustion to create motion. About 75% of the energy in gasoline is converted to waste heat in today's internal combustion engine. A tunneling conversion device could recover much of that heat energy from the engine of a hybrid automobile and put it into the battery for later use. U.S. Pat. No. 6,651,760 (Cox, et al.) teaches a method of converting the heat from a combustion chamber and storing or converting the energy to motion.

(3) Reducing the need for noxious gases to enter the atmosphere. The more energy-efficient hybrid automobile is a clear example where noxious exhaust gases escaping into the atmosphere can be reduced. A device that converts engine and exhaust heat of the hybrid engine and then stores or produces electricity in the hybrid battery would further increase the efficiency of the hybrid automobile and reduce the need to expel noxious gases. Coolants used in refrigeration are other examples of noxious gases that are necessary to remove heat, and tunneling conversion devices could reduce the need for emission of noxious gases.

(4) Recovery of heat energy at a time when it is available, then storing it as chemical energy in a battery, and then re-using it at a time when it is not available. Tunneling conversion devices could convert the sun's energy to electricity during the day and then store it in a battery. During the night, the stored battery power could be used to produce electricity.

(5) Power generation from geothermal energy. Heat exists in many places on the surface of the earth, and is virtually infinitely abundant deep inside the earth. An efficient tunneling conversion device could tap this supply of energy.

(6) Production of refrigeration by compact, silent and stationary solid state devices, where such a tunneling device could provide cooling for air conditioners or refrigeration to replace the need for bulky pneumatic machinery and compressors.

(7) Power generation from body heat. The human body generates about 100 watts of heat, and this heat can be converted to useful electrical power for handheld products like cell phones, cordless phones, music players, personal digital assistants, and flashlights. A thermal conversion device as presented in this disclosure can generate sufficient power to operate or charge the batteries for these handheld products from heat applied through partial contact with the body.

(8) Electrical power from burning fuel. A wood stove generates tens of thousands of watts of heat. Such a tunneling device could generate one or two kilowatts from that heat which is enough to power a typical home's electric appliances. Similar applications are possible by burning other fuels such as natural gas, coal, and others. Then homes in remote areas may not require connection to the power grid or noisy electrical generators to have modern conveniences.

The challenge in bringing two parallel electrodes together within less than 20.0 nanometer separation gap requires attention to two parameters. One is the surface roughness and the other is the surface flatness. Surface roughness is the deviation from smoothness in a small, local area. Holes and scratches are examples of deviations that affect surface roughness. Surface flatness is the deviation from parallelism over a large area. Warping, bending, creeping are examples of deviations that affect surface flatness.

When two rigid materials are polished flat using the best techniques available today for integrated circuits, the surface flatness is on the order of micrometers over a square centimeter area. Furthermore, heat and other stresses can cause changes in warping and bending over time, presenting a further challenge in maintaining uniform separation once achieved. A polished metal or semiconductor surface using today's techniques can easily achieve a roughness of less than 0.5 nanometers.

The state of the art of a tunneling energy conversion device suffers from one or more of the following limitations: (1) a separation that is too large for tunneling, (2) an area that is too small for significant energy conversion, (3) layers of solid material that cannot be thermally isolated resulting in low conversion efficiency, and (4) a design that is too complex to manufacture cost effectively.

A separation of 10 microns or more has been achieved by many thermionic systems, but these systems only operate at very high temperatures, require a costly design for safety, and are limited to environments where this temperature is achieved.

A separation of about 2.0 to 20.0 nanometers has been achieved by a method taught in U.S. Pat. No. 4,343,993 (Binnig, et al.) in the design of the scanning tunneling microscope, but the effective area was on the order of a few square nanometers. Such area was too small (compared to the desired area of about one square centimeter or more) to allow enough current to flow through, even in the most optimal of materials, to convert significant energy.

The semiconductor industry teaches and employs many methods for controlling physical parameters like film thicknesses that are on the order of several nanometers. Thermoelectric devices are an example of integrated circuits that convert energy with a stack of layered materials. See *Design and Characterization of Thin Film Microcoolers*, by Chris LaBounty, Ali Shakouri, and John E. Bowers, Journal of Applied Physics, Volume 89, No. 7, 1 Apr. 2001. However, these methods all require solid materials to be in contact with each other in layers. The heat flows easily from layer to layer, limiting the temperature difference and the conversion efficiency. Because the two electrodes are in contact, the design is at the mercy of available thermoelectrically sensitive materials, and the energy barrier for the electrons to traverse cannot be arbitrarily configured, as is possible by setting the width of a vacuum gap. The materials having needed properties are exotic and expensive elements like bismuth and telluride. For these reasons, thermoelectric devices are limited to a high cost per watt of cooling power and a low efficiency of about 7 percent.

The art of separating two conductors by about 2.0 to 20.0 nanometers over a square centimeter area has been advanced by the use of an array of feedback control systems that are very precise over these distances. A control system includes a feedback means for measuring the actual separation, comparing that to the desired separation, and then a moving means for bringing the elements either closer or further away in order to maintain the desired separation. The feedback means can measure the capacitance between the two electrodes, which increases as the separation is reduced. The moving means for these dimensions is, in the state of the art, an actuator that produces motion through piezoelectric, magnetostriction, or electrostriction phenomena. U.S. Pat. No. 6,720,704 (Tavkhelidze, et al.) and US Patent Application No. 2007/0033782 (Taliashvili et al.) describes such a design that includes shaping one surface using the other and then using feedback control systems to finalize the parallelism prior to use. Because of the elaborate processes involved in shaping one surface against the other and the use of multiple feedback control systems to maintain parallelism, this design approach is a challenge to manufacture at a low cost.

Other methods have been documented in U.S. Pat. No. 6,774,003 (Tavkhelidze, et al.), and US Patent Applications 2002/0170172 (Tavkhelidze, et al.), 2006/0038290 (Tavkhelidze, et al.), and 2001/0046749 (Tavklielidze, et al.) that involve the insertion of a "sacrificial layer" between the electrodes during fabrication. The sacrificial layer is then evaporated to produce a gap between the electrodes that is close to the desired spacing of 2 to 20 nanometers. These three methods are either susceptible to post-fabrication fluctuations due to warping or thermal expansion differences between the electrodes, or require the array of actuators to compensate for these fluctuations, as described in US Patent Application Nos. 2005/0189871 (Tavkhelidze, et al.) and 2007/0056623 (Tavkhelidze, et al.).

Another method of achieving and maintaining the desired spacing over time is documented in U.S. Pat. No. 6,876,123 (Martinovsky, et al.) and in US Patent Application Nos. 2004/0050415, 2006/0192196 (Tavkhelidze, et al.), 2003/0042819 (Martinovsky, et al.), 2006/0207643 (Weaver et al.), and 2007/0069357 (Weaver et al.) through the use of dielectric spacers that hold the spacing of a flexible electrode much like the way poles hold up a tent. One disadvantage of these dielectric spacers is that they conduct heat from one electrode to the other, reducing the efficiency of the conversion process. Another disadvantage of this method is that the flexible metal electrodes can stretch or deform between the spacers over time in the presence of the large electrostatic forces and migrate slowly toward a spacing that permits conduction rather than tunneling or thermionic emission.

Another method for achieving a desired vacuum spacing between electrodes is reveled in US Patent Application Nos. 2004/0195934 (Tanielian), 2006/0162761 (Tanielian), 2007/0023077 (Tanielian), and 2007/0137687 (Tanielian) wherein small voids are created at the interface of two bonded wafers. These voids are small enough to allow thermo-tunneling of electrons across a gap of a few nanometers. Although these gaps can support thermo-tunneling, unwanted thermal conduction takes place around the gaps, and the uniformity of the electrode spacing is difficult to control.

Yet another method for achieving a thermo-tunneling gap is by having the facing surfaces of two wafers be in contact, then using actuators to pull them apart by a few nanometers, as described in U.S. Patent Application 2006/0000226. Although this method can produce a thermo-tunneling gap, this method suffers from the cost of multiple actuators and the thermal conduction between wafers outside of the gap area.

There remain continuing and difficult challenges in meeting the requirements for achieving and maintaining electrode spacing at less than 20.0 nanometer separation gaps, and in mass-producing low cost thermo-tunneling devices, in spite of efforts to date.

An additional utility for a device that can move electrons across a vacuum gap (in addition to providing cooling directly) is to place this gap on top of the thermoelectric stack. In this combination, the hot side and the cool side of the thermoelectric gap become thermally insulated and hence more efficient. A device with a combination of thermoelectric materials and a vacuum gap can provide cooling or heat conversion via thermoelectric methods, thermo-tunneling methods, thermionic methods, or a combination of these methods.

A need, therefore, exists for an improved design for maintaining vacuum separation between electrodes in tunneling, diode, and other devices that is more efficient and less costly than existing designs. In particular, a need exists for a design having closely spaced electrodes with a uniform vacuum gap. More particularly, a need exists for a design having a pair of electrodes which self-position and self-align at a close spacing gap between them to enable the transfer of electrons across the gap by tunneling, thermionic, or other emission, possibly in combination with thermoelectric elements.

In my aforesaid parent application I describe and claim a device and a process that employ electron flow in a manner not contemplated by the prior art. In prior designs the flow of electrons in the tunneling device was used for two purposes: (1) as a thermodynamic fluid to transfer heat from one conductor to another, and (2) to move the converted energy directly to or from a battery or electrical circuit. In my aforesaid parent application I describe a device construction and process in which electron flow is also used to generate a restoring force that balances the electrostatic and other attractive forces at a desired separation of the electrodes.

A device and a process are disclosed providing closely spaced electrodes with a uniform gap. More particularly, the disclosure concerns a pair of electrodes which self-position and self-align at a close spacing gap between them to enable the transfer of electrons across the gap by tunneling, thermionic, or other emission, possibly in combination with thermoelectric or thermo-photovoltaic elements.

As described in my aforesaid parent application a flexible material is used for one of the electrodes, and includes a magnetic field to counterbalance electrostatic or other attractive forces with magnetostatic repelling forces that naturally and simultaneously act on the flexible electrode to position, align and maintain it in a stable equilibrium position at a desired spacing distance from the other electrode surfaces over a large area, and adapt to continual spatial deviations from flatness in either electrode.

A surface roughness of less than 0.5 nanometer is achieved by polishing the electrodes' facing surfaces before assembly. Polishing techniques are readily available in the industry for achieving less than 0.5 nanometers surface roughness on metals, semiconductors, and other materials.

In order to achieve a separation of less than 20.0 nanometers across a large area of one square centimeter or more, a combination of non-contacting forces are generated to cause the electrode materials to come to rest at the desired spacing. In stable equilibrium conditions, one force that is already present in these diode devices is the electrostatic force between the emitter and collector. As a voltage is applied, opposite charges assemble on each of the electrodes and the presence of these charges results in an attractive force between the electrodes. Although the electrostatic force is considered to be the dominant attractive force in closely spaced electrodes, other attractive forces are also present such as gravity, surface tension, Van der Waals forces, Casimir forces, and static friction.

As described in my parent application a second equal but opposite force is created which acts on the flexible electrode to balance the attracting electrostatic force and other attractive forces at all points such that the flexible electrode maintains the desired spacing and alignment. This second force can be due to a physical phenomenon wherein a force is created when a current flows in a conductor in the presence of a magnetic field. The force acts in a direction that is perpendicular to the plane defined by the direction of the current flow and the direction of the magnetic field.

The present invention provides improvement over the device and process of my parent application. In one aspect, this second force could be due to the bending of an assembly of two materials bonded together with differing thermal expansion characteristics, i.e. a "bimetal". This bending force is created by temperature increases or decreases of the bimetal in response to heat moved in thermal operation or by electrical losses in electrical operation or a combination of these. Either the magnetic force or the bimetal force can be designed into the present invention's embodiments of a 0.5 to 200 nm gap that achieves the goals, either individually or simultaneously, of (1) spanning a large area and (2) automatically achieves uniformity without lossy spacers or arrays of actuators and control systems.

The magnetic field needed can be added to the first embodiment of the invention by having a permanent magnet near or within the electrodes. Permanent magnet materials like iron, cobalt, and nickel and their alloys are also metals that are highly conductive, both thermally and electrically. Hence, these magnetic materials are compatible with the thermal and electrical conductivity characteristics of the electrodes. Even if it were desired to use a non-conducting magnetic material to provide the magnetic field, such a magnet may be coated by a conductor or simply have a flat conductor mounted to it in order to construct the emitting electrode.

The temperature of the surface where the permanent magnet is placed can affect its operational parameters as magnetic materials lose their magnetization at the Curie temperature level, which is typically between 600 and 1400 degrees Kelvin. However, in the present invention, the magnet may be placed either on the cool side or the hot side of the conversion device, so configurations can be found to prevent the magnet from reaching its Currie temperature.

The present invention provides a way for electrode materials to be brought together in a new, unobvious manner to produce a simple and inexpensive thermo-tunneling, thermo-photovoltaic, or thermionic device which has the following advantages: (1) simplicity by eliminating the need for actuators and control systems required by the prior art, (2) making use of the technology and manufacturing processes already developed in the electric light bulb and semiconductor industries to achieve low cost and mass production, (3) achieving the narrow spacing gaps between electrodes without the use of spacers so as to permit tunneling of hot electrons from one electrode to the other thereby cooling the first electrode, and (4) maintaining a uniform spacing gap over large electrode areas such as one square centimeter.

Other systems, devices, features and advantages of the disclosed device and process will be or become apparent to one with skill in the art upon examination of the following drawings and detailed description. It is intended that all additional systems, devices, features, and advantages be included within this description, be within the scope of the present invention, and be protected by the accompanying claims.

BRIEF DESCRIPTION OF THE DRAWINGS

Many aspects of the disclosed device and process can be better understood with reference to the attached drawings, FIGS. 1-23. The components in the drawings are not necessarily to scale, emphasis instead being placed upon clearly illustrating the principles of the present invention. Moreover, in the drawings, like reference numerals do not need corresponding parts throughout the several views. While exemplary embodiments are disclosed in connection with the drawings, there is no intent to limit the disclosure to the embodiments disclosed herein. On the contrary the intent is to cover all alternatives, modifications and equivalents.

FIG. 9b is a graph, similar to FIG. 5, illustrating interacting forces in the device of FIG. 9a;

FIG. 12c illustrates an alternative wherein the wire filaments include connections that are electrically routed through the doped silicon sides to eliminate wire holes and feed-throughs;

FIG. 16 shows how the bimetal embodiment of FIG. 15 can be placed inside of a silicon MEMs package in combination with a moving actuator to control the gap width.

FIG. 18a depicting the device in an inactive state, FIG. 18b depicting the device in a normal, active state, and FIG. 18c depicting the device in an over-temperature state.

DETAILED DESCRIPTION OF THE EXEMPLARY EMBODIMENTS

Figure 1:
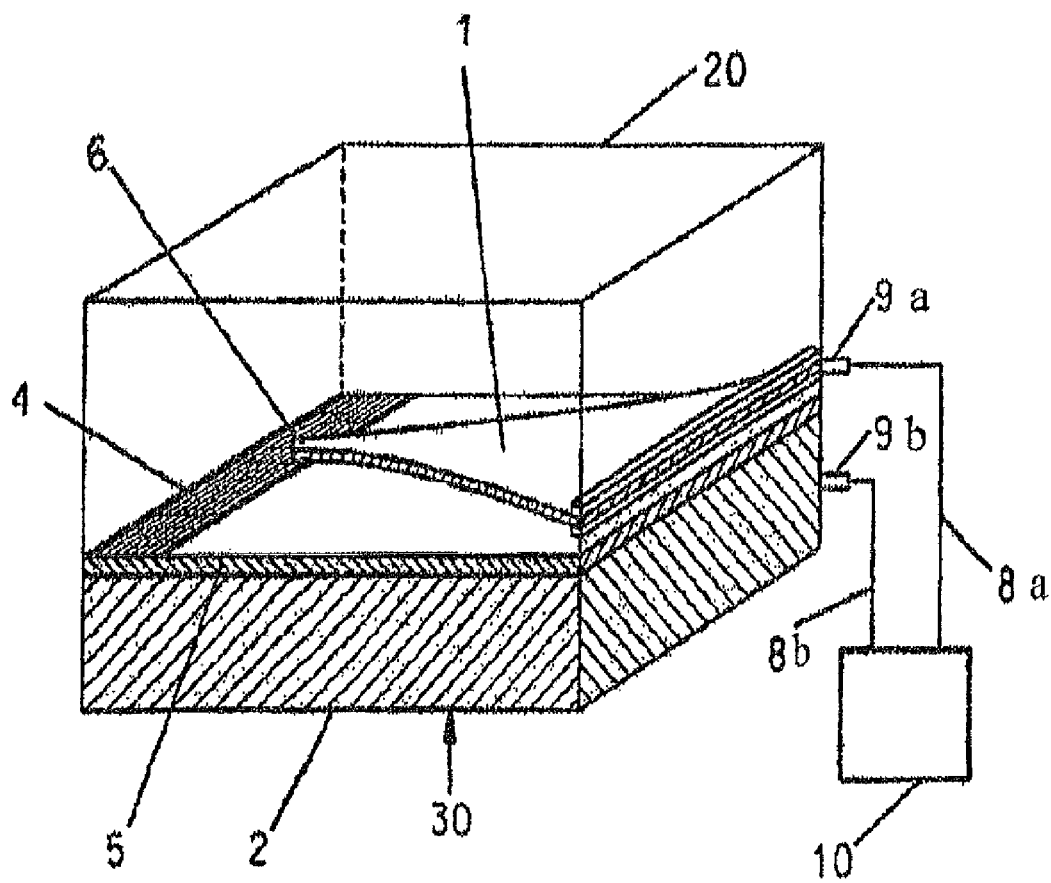
FIG. 1 illustrates one embodiment of the self-positioning electrode device of the present disclosure.

Referring more specifically to the drawings in which like reference numerals refer to like elements throughout the several views, exemplary embodiments of the device and process of the present disclosure are illustrated in FIG. 1-24.

In general, a device and a process are disclosed employing facing electrodes and involving two force distributions. A primarily electrostatic attracting force distribution 3 between the electrodes is generated by an electric charge within the electrodes. An equal but opposite repelling force distribution is generated by the electric current distribution within the electrodes combined with an applied magnetic field distribution. The two force distributions act simultaneously to establish a stable equilibrium 7 separation of the electrodes across their facing surfaces.

In the following detailed description FIGS. 1-8 are identical to FIGS. 1-8 of my aforesaid parent application.

FIG. 1 shows one embodiment of the present disclosure. Electrode 1 is a flexible metal foil or a metal foil mounted on a plastic film or substrate like polyimide. The plastic substrate helps prevent the foil from cracking, creasing, or breaking after repeated motions created by electrostatic and electromagnetic forces. The plastic substrate or electrical properties of electrode 1 can also act to prevent vibration or instability of its motion during equilibration. Electrode 2 is a permanent magnet either made of or coated with a conducting material. In an exemplary form electrode 2 is a rectangular block. Both electrodes are polished on the surfaces facing each other. Heat source 30 is present if the device is used for conversion of thermal energy, or is an object to be cooled if the device is used as a refrigerator. Power supply 10 is present if the device is used as a refrigerator and is additionally an electrical load if the device is used as a thermal conversion generator. Insulating layer 4 is present to allow a non-conducting resting point for tip 6 of electrode 1 when the device is not in operation (i.e., while the device is turned off). Additionally, one of the electrodes can have a coating of a non-conducting material thinner than the desired equilibrium spacing between the electrodes on which another of the electrodes rests when the device is not in operation. Layer or coating 5 on top of electrode 2 is a material designed to have a low work function to facilitate electron tunneling between electrode 2 and electrode 1. Connectors 9a and 9b and wires 8a and 8b complete the circuit. Chamber 20 seals the area between the facing electrodes 1 and 2 with either a vacuum or inert gas to minimize heat transfer from one electrode to the other. Suitable gases include argon and helium. The wider end of flexible electrode 1 is fixedly mounted to a support structure in chamber 20, and electrode 1 comes to rest at tip 6 on the insulating layer or film 4 when the power is off.

Figure 1A:
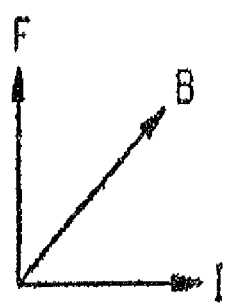
FIG. 1a illustrates the directional status of current, the magnetic field, and the magnetostatic force in the device of FIG. 1.

FIG. 1a indicates the directional status of the current (I) flowing in electrode 1, the magnetic field (B) generated by the presence of the permanent magnet within electrode 2, and the force F resulting from the interaction of I and B. The force F acts in the vertical upwards direction at every point on electrode 1, opposing and balancing the electrostatic attracting force that pulls electrode 1 downwards toward electrode 2.

Figure 1B:
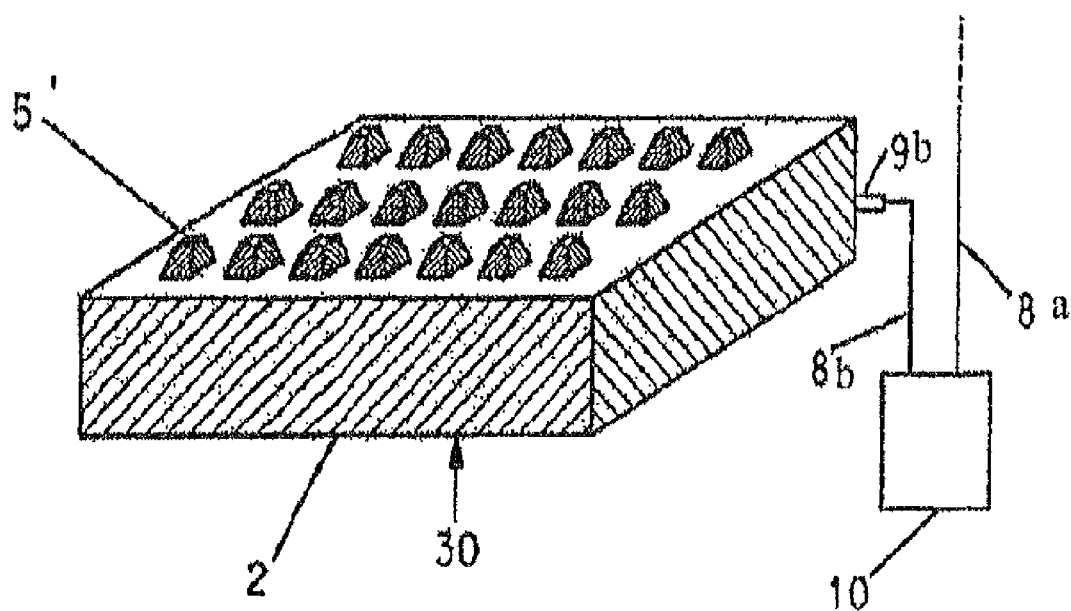
FIG. 1b illustrates an alternate embodiment of electrode 2 in the device of FIG. 1.

FIG. 1b shows an alternative arrangement for electrode 2. Here, the surface of the material is patterned with an array of peaks 5'. The geometry of these peaks permits enhancement of electron emission from electrode 2 due to magnified electric fields in the region of the peaks. These peaks may also occur naturally due to intended or unintended roughness of the surface of electrode 2 after polishing.

The device of FIG. 1 may also have additional force generating or altering mechanisms or systems to assist its operation during power-off, equilibrium, or transitioning from power-off to equilibrium or transitioning from equilibrium to power-off. For example, these mechanisms could dampen the system to prevent vibrations or oscillations of electrode 1 around its equilibrium resting position. These additional forces may be created mechanically, magnetically, electromechanically, electromagnetically, or by other ways to offset deficiencies or excesses in the magnitude of the primary electrostatic and magnetic counter-balancing forces.

The material for flexible electrode 1 can be a conductive metal, a semiconductor material, layered glass/metal or layered metal/plastic. Exemplary conductive metals include gold, silver, aluminum, and copper. Exemplary semiconductor materials include silicon, germanium and gallium arsenide. The conductive metal or semiconductor material can optionally be mounted on or combined in layers with a material that adds flexibility to the metal if the metal is not sufficiently flexible by itself, such as glass, polyamide, polyester, polyimide, polyacrylic or polyolefin.

The permanent magnet of electrode 2 can be either contained within or be a part of the electrode. In an exemplary embodiment the permanent magnet can contain conducting ferromagnetic materials in any combination of iron, cobalt, nickel, neodymium or aluminum. Alternatively, the permanent magnet can contain one or more non-conducting ferromagnetic materials coated with a conducting material. Exemplary non-conducting ferromagnetic materials include ferrite, barium ferrite, and iron oxide particles sealed in a binder.

Layer or coating 5 on electrode 2 can be a low work function material, a thermoelectrically sensitive material, a resonant tunneling material, an electric field enhancing texture, or a combination of these. Exemplary embodiments of a low work function material include any layered or other combination of alkali metal, an alloy of alkali metal, an oxide, or diamond such as diamond film, or nanotubes. A collection of peaks and valleys arising from surface roughness or patterning (as, for example, illustrated in FIG. 1b) can enhance the electric field and hence improve electron emission from electrode 2. Finally, a semiconductor layer arranged to achieve resonant tunneling can also improve electron emission. Exemplary semiconductor materials include silicon, germanium and gallium arsenide. Exemplary thermoelectrically sensitive materials include bismuth telluride of various dopings.

The low work function material in layer 5 of FIG. 1 or enhancing material 5' in FIG. 1b can be, for example, cesium (Cs), barium (Ba), strontium (Sr), rubidium (Rb), germanium (Ge), sodium (Na), potassium (K), calcium (Ca), Lithium (Li), and combinations or oxides thereof. Such materials are shown to reduce the work function of the emitting electrode 2 from 4-5 eV down to as low as 1.1 eV or lower. Additional low work function materials include thorium (Th), metal-coated oxides and silicon. Other materials not mentioned here can also achieve low work functions, and the addition of such a layer of material is an obvious extension of the invention. For example, a different type of layer, wide gap semiconductor layer to facilitate electron tunneling is proposed by Korotkov. See *Possible Cooling by Resonant Fowler-Nordheim Emission*, by A. N. Korotkov and K. K. Likharev, Applied Physics Letters, Volume 75, No. 16, 23 Aug. 1999. Therein, a thin oxide layer, whose thickness is controlled carefully, excites the electrons to a resonant condition thereby assisting the hot electrons to escape to the vacuum. Also, layer 5 of FIGS. 1 and 5' of FIG. 1b could be an array of carbon nanotubes or a similar arrangement to maximize emission and minimize work function. Insulating layer 4 materials may include glass, polyimide, or other plastics.

The flow of the electrons in FIG. 1 and the uniqueness of the invention can be described as follows. The free electrons flow from the power supply or electrical load 10 to the emitting electrode 2. The free electrons that are emitted from electrode 2 to electrode 1 are selected by this design to be the hot electrons that can remove heat from electrode 2. One aspect of this invention is that the free electrons flow within electrode 1 from left to right in FIG. 1. in the presence of a magnetic field B directionally shown in FIG. 1a. This free electron flow direction in combination with the applied magnetic field generates a repelling force directionally shown in FIG. 1a that balances the attractive electrostatic force and achieves a constant and desired separation between electrode 1 and electrode 2 over a large area.

Figure 2:
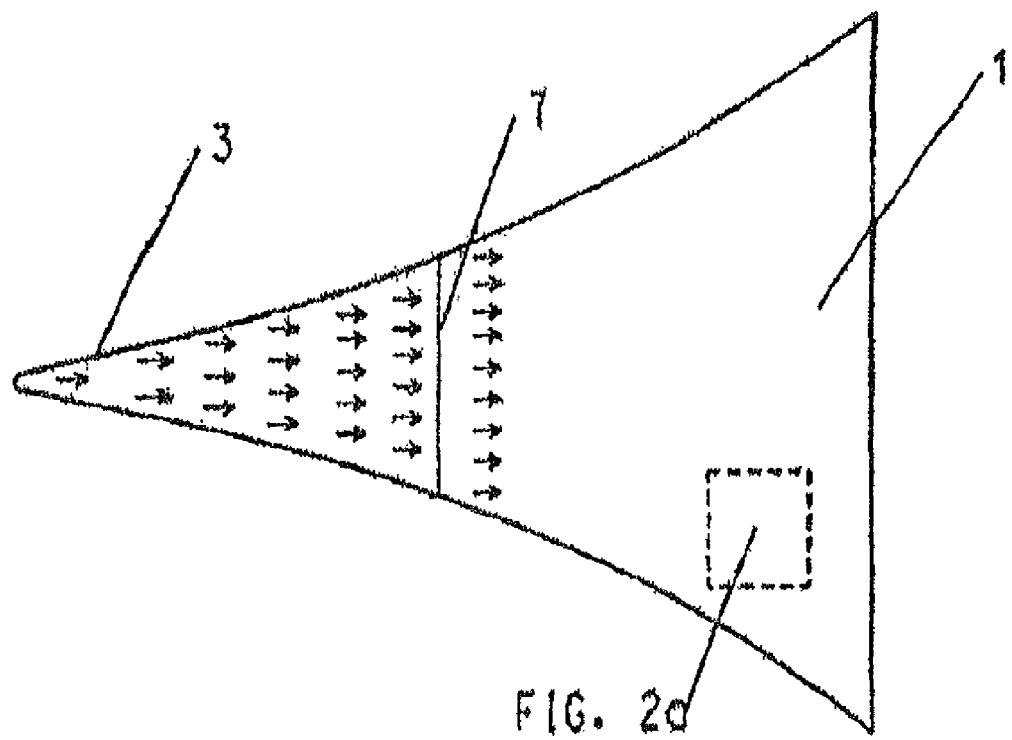
FIG. 2 is a schematic top plane view of electrode 1 of the device of FIG. 1.

FIG. 2 is a schematic of a top view of the exemplary embodiment of electrode 1 in FIG. 1 showing a cross-section 7 with arrows pointing in the direction of electron flow. Cross-section 7 has a current density equal to the aggregate tunneling current that is picked up by all of the electrode's surface to the left of 7 divided by the length of cross-section 7. As the tunneling current is expected to be proportional to the area of tunneling activity to left of 7, then the length of cross-section 7 will optimally increase in proportion to the increase in area of the electrode surface to its left. The border 3 of electrode 1 therefore traces out an exponential function. Thus, the width of the surface of flexible electrode 1 grows exponentially from its tip 6 to its opposite end. An exponential function is mathematically equal to the area bounded by it and the X-axis up to its integration point. The function traced out by border 3 can also compensate for other variations in current density, such as electrical resistance due to path length inside electrode 1. Also, in some cases, the design can be sub-optimized with a triangular shaped electrode 1 for ease of manufacturing.

Figure 2A:
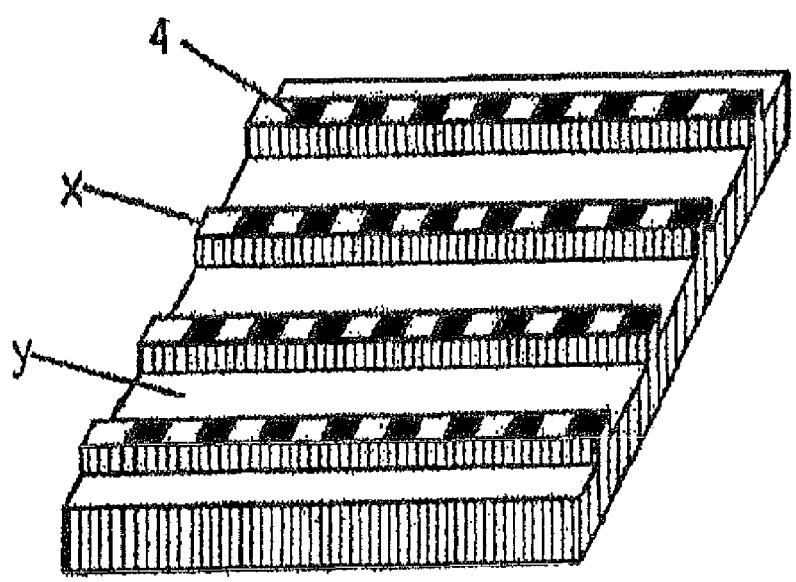
FIG. 2a is a perspective bottom view illustrating a cut out portion of an embodiment of the electrode of FIG. 2.

FIG. 2a is a schematic view of the bottom side of the cut out portion of electrode 1 shown in FIG. 2. It illustrates how electrode 1 may be patterned on its bottom surface, which faces electrode 2. The pattern allows the tunneling area (defined by the total area X of elevated surface x) to be different from the total area Y that is available for current to flow. Patterning electrode 1 in this way allows for larger total area Y and hence lower electrical resistance losses and heat generation losses for the aggregate current to flow. At the same time it minimizes the area that is close to electrode 2, which reduces the electrostatic force that must be overcome to place the electrodes in their desired positions. The same effect of patterning of electrode 1 may also be accomplished by intentional or unintentional surface roughness after polishing. The intermittently elevated segments 4 are thin insulating layers which can support electrode 1 and prevent electrical shorts as the foil material of electrode 1 drapes toward electrode 2 when the device is turned on.

Figure 3:
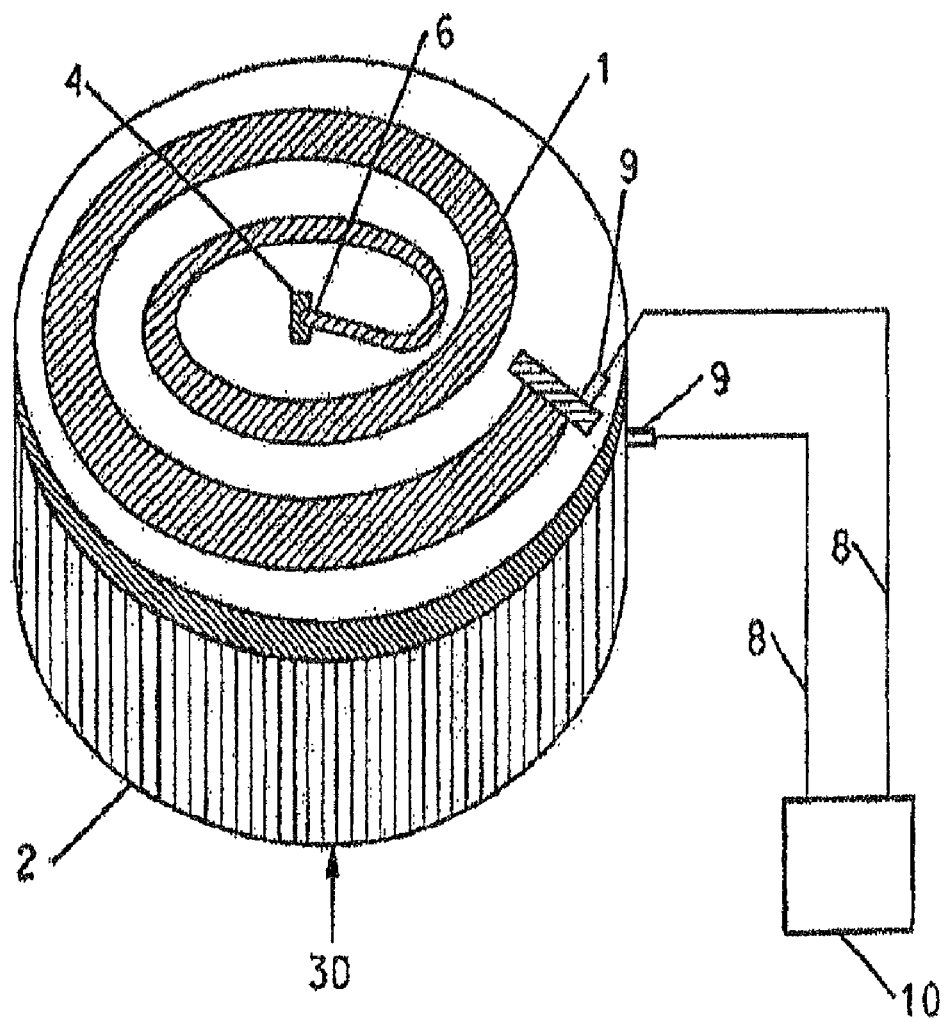
FIG. 3 illustrates an alternative embodiment of the device of FIG. 1.

FIG. 3 is a schematic showing another embodiment of the present disclosure that can achieve a more compact package. Here, electrode 2 is a cylindrical permanent magnet with magnetization direction emanating radially outward from the center. Electrode 1 now takes the shape of an exponential spiral, whose width increases exponentially with every turn. Alternatively, electrode 1 can have a linearly increasing spiral shape as a simpler approximation to the exponential spiral shape for ease of manufacturing. Because electrode 1 has a spiral shape, the current flow is in the tangential direction. The force on electrode 1 acts in the vertical direction, providing a repelling force that balances the electrostatic attracting force similar to that achieved in FIG. 1. The spiral shape of electrode 1 makes this embodiment have a more compact design, because the total tunneling area is not required to be spread across one long dimension as in FIG. 1. Cylindrical magnets with radial magnetization (measuring the magnetic field in a radial direction from the center of the device) are routinely available in the industry, as they are popular for building loudspeakers. The remaining components of this embodiment are the same as FIG. 1.

Figure 4:
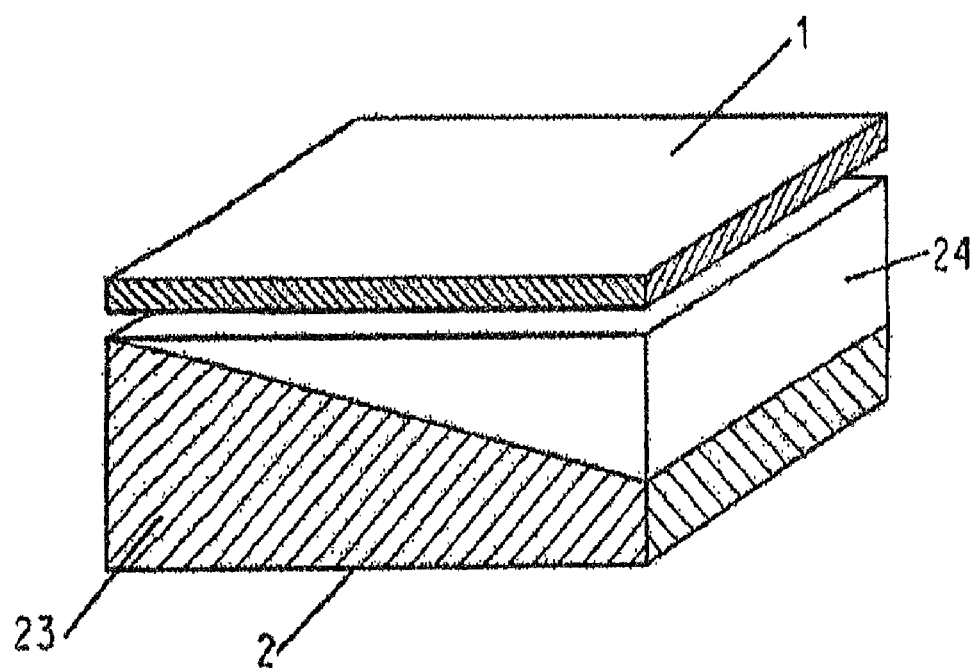
FIG. 4 illustrates yet another embodiment of the device of FIG. 1.

There are many other obvious embodiments to this invention in addition to the embodiments in FIGS. 1 and 3, which use a special shape of one electrode to achieve a uniform repelling force. FIG. 4 is a schematic drawing of one such other exemplary embodiment. It uses a varying magnetic field instead of a varying width electrode. For example in FIG. 4, the current density in electrode 1 increases from left to right as more current is made available from the tunneling area. In order to achieve a uniform force across electrode 1, the magnetic field is deceased from left to right because less field strength is needed as more current density is developed. Thus, the strength of the magnetic field varies in inverse proportion to the current density in flexible electrode 1 so as to achieve a constant force. One way for the magnetic field to decrease from left to right is to vary the depth of the permanent magnet material 23 contained in electrode 2 and increase the amount of non-magnetized material 24, such as copper or aluminum.

Figure 5:
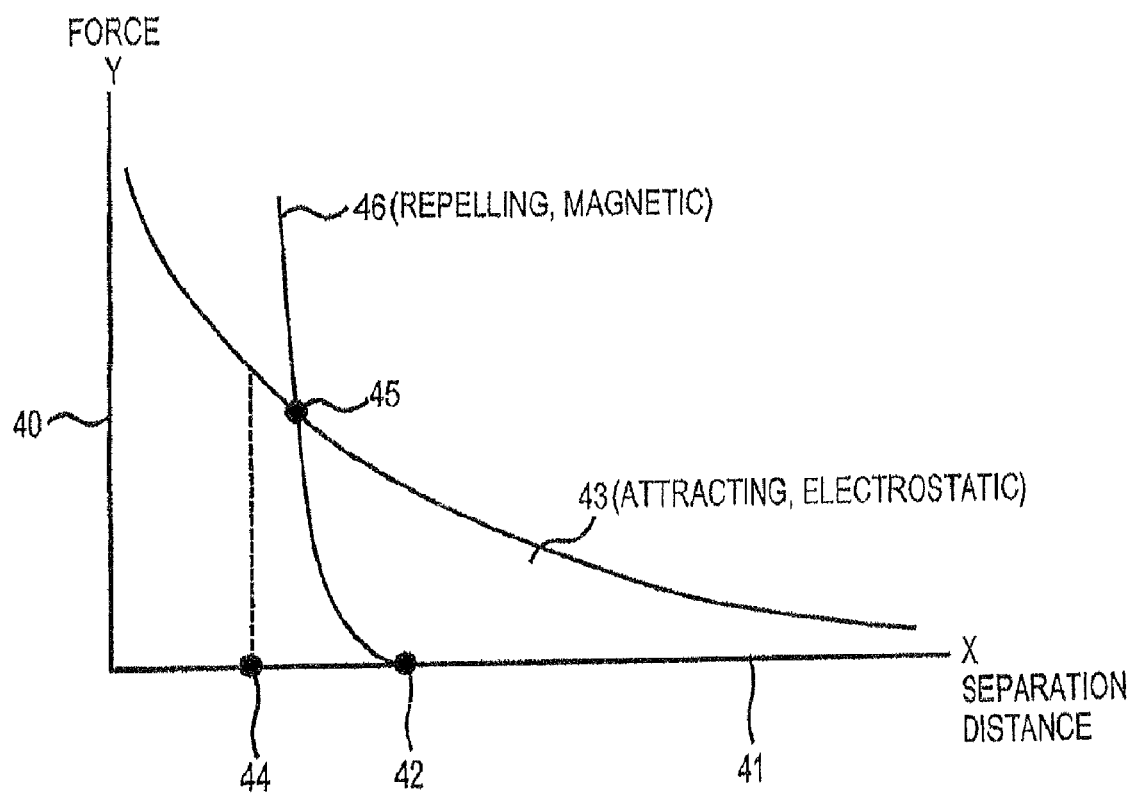
FIG. 5 is a graph qualitatively illustrating interacting forces in the devices of FIGS. 1-4.

FIG. 5 is a graphical illustration showing how the forces interact in FIGS. 1 through 4 to produce a constant spacing between the two electrodes over the tunneling area The Y-axis 40 is force, and the X-axis 41 is spacing gap width or separation distance between the electrodes. Curve 43 shows the attracting, electrostatic forces between electrode 1 and electrode 2. The force illustrated in curve 43 is inversely proportional to the square of the spacing gap 41. Curve 46 shows the repelling force between the two electrodes generated by the tunneling current flowing in the presence of the magnetic field. This current is close to zero until the separation becomes narrow enough for tunneling to occur. Then it increases very rapidly as the spacing decreases further. The locations of the starting separation point for tunneling 42 and the separation point for full conduction 44 depend on the process conditions used. For example the starting separation point 42 for tunneling is around 20 nanometers for a device with an applied potential of 0.1-2.0 volts, and the point of essentially full conduction 44 is around 1 nanometer, according to Hishinuma. See *Efficiency of Refrigeration using Thermotunneling and Thermionic Emission in a Vacuum: Use of Nanometer Scale Design*, by Y. Hishinuma, et al; supra; and *Measurements of Cooling by Room Temperature Thermionic Emission Across a Nanometer Gap*, by Y. Hishinuma, et al.; supra. The attracting and repelling forces are equal at point 45. This is the separation where the device comes to rest in its stable equilibrium position. If any disturbances to the device cause a separation greater than point 45, the attracting force represented by curve 43 overpowers the repelling force represented by curve 46, causing tendency to move back to equilibrium point 45. Similarly, any disturbance that causes separation to be less than point 45, the repelling force represented by curve 46 overpowers the attracting force represented by curve 43 and again restores the device to its the equilibrium point 45.

In addition to the aforementioned electrode arrangement, the electrodes can also be arranged in multiple layers of periodic spacing. Additionally, multiple units of the device can be assembled in series, or in parallel, or in parallel and in series in order to achieve higher levels of energy conversion.

In operation, the strengths of the current distribution or density in flexible electrode 1 and the magnetic field of facing electrode 2 are adjusted to place the electrodes in a stable, spaced apart, equilibrium position. In one exemplary embodiment, when the device of the present disclosure is used in converting heat to electrical energy or to cool using electron tunneling or thermionic electron transfer, or a combination of electron tunneling and thermionic principles, the strengths of the current density or distribution in electrode 1 and the magnetic field of electrode 2 can be adjusted to place the facing electrodes in a stable, spaced apart, equilibrium position in the range of 1 nanometer to 20 nanometers using a flexible metal foil for one electrode. In another exemplary embodiment, when the device of the present disclosure is used in heat conversion to cooling or power generation by thermionic electron transfer, the strengths of the current density or distribution in electrode 1 and the magnetic field of electrode 2 can be adjusted to place the facing electrodes in a stable, spaced apart, equilibrium position in the range of 1 nanometer to 20 nanometers using a silicon wafer as the substrate for one or both electrodes.

The device of the present disclosure can be used in a process to convert heat to cooling or to electrical energy. The heat source can be a radiation source such as sun radiation, heat from the environment, geothermal energy, or heat generated from engines or animal metabolism, such as but not limited to heat from a living human body. The heat source can also be from a running electrical, steam or internal combustion engine, or by burning fuel as in a stove such as a wood stove or coal stove or other stove type, or their exhaust gases. When the heat source is, for example, from a running internal combustion engine or its exhaust gases, the present device can be incorporated in the engine or gas exhaust line as a heat sink. The fuel for burning can be wood, natural gas, coal or other combustible fuel. The converted energy can be stored such as in a battery or directed to power a handheld electrical device such as a cell phone, cordless phone or other aforementioned product.

The operation of the device of the present disclosure will now be explained when it is operating as a refrigerator. Referring again to FIG. 1, a voltage, increasing from zero, is applied between electrode 1 and electrode 2 by power supply 10. This voltage results in an electrostatic force that pulls the tip 6 of electrode 1 toward the surface of electrode 2. As the voltage is increased gradually, flexible electrode 1 bends downward toward the surface of electrode 2 in a rolling fashion starting from tip 6. This bending continues until electrode 1 gets so close to electrode 2 that a tunneling current starts to flow upwards from electrode 2 to electrode 1. This tunneling current, once reaching electrode 1 flows horizontally to the right within electrode 1 toward connectors 9a and 9b. Because this current is flowing in the I direction of FIG. 1a, and the magnetic field produced by the permanent magnet in nearby electrode 2 is in the B direction, then a force will act to push electrode 1 upwards. So long as the voltage from supply 10 continues to be increased, electrode 1 will flatten and match contours with the surface of electrode 2. The electrostatic force acts to pull the two electrode surfaces toward each other, and the opposing force from the current flow in electrode 1 prevents the two electrodes from getting closer than the desired spacing.

The operation of the device of the present invention as a generator device is similar, except that heat source 30 generates "hot electrons" moving from a high energy state of being hot in electrode 2 to a lower energy state of being cool in electrode 1. It is this motion of electrons from one energy state to another that creates the current flow between the electrodes. Electrical load 10 becomes the sink for the electrical energy thus produced.

In refrigeration operation, the electrical energy is used from the power supply to pull the hot electrons away from electrode 2 thereby cooling it. When operating as an electrical generator, heat source 30 is used to push electrons to the power supply.

The invention will be further illustrated by the following examples which are based on fundamental laws of physics in conjunction with experimental data and measurements obtained by the inventor and academic scientists as described herein. These examples show that: (1) the device of this disclosure can be designed and built using dimensions and processes that are common in the industry, (2) the quantified forces generated will result in the desired electrode separation, and (3) the electrical properties of the invention device can carry and transmit the converted electrical energy effectively. The examples demonstrate the above three attributes of the invention device for thermo-tunneling converters, in which the electrode separation is less than 20 nanometers and for thermo-photovoltaic converters in which the electrode separation is about 100 nanometers.

Example 1

For a thermo-tunneling converter, consider the following dimensions in FIG. 1, 2 or 3:

The total overlapping tunneling area Y of the facing electrodes is 1 square centimeter or $10^4$ square meters. The length L of the flexible electrode 1 is 2 centimeters, and the maximum width W is 1 centimeter. The length L and width W are defined similarly for FIG. 3, but electrode 1 is wrapped around into a spiral shape as compared to a linear shape for FIG. 1. The facing surface of electrode 1 is surface-patterned or has a surface roughness such that the total tunneling area X (the sum of all x's) is one-tenth the total surface area Y or $10^{-5}$ square meters. The permanent magnet material used in electrode 2 has a field strength B of 1.2 Tesla. The voltage V between the electrodes is 0.15 volts. The permittivity constant r of either vacuum or rarified inert gas between electrodes 1 and 2 is equal to $8.8 \times 10^{-12}$ farads per meter. The resistivity r of the flexible electrode 1 is assumed to be close to that of copper, or $1.7 \times 10^{-8}$ ohm-meter. The resistance of the path of electrons from the upper connector 9a to the other, lower connector 9b is assumed to be fully concentrated in electrode 1 due to it needing to be thin and flexible compared to the rest of the circuit. The thickness t of flexible electrode 1 is 20 microns, and therefore is a foil material.

The formula for the attracting electrostatic force $F_e$ is $\frac{1}{2} \in XV^2/d^2$ where d is the separation between the electrodes. The formula for the repelling, magnetic force $F_m$ is ILB where I is the current, and L is the effective average length of the current flow in electrode 1.

The tunneling current I as a function of separation is taken from the graphs of Hishinuma and assumes a work function of coating 5 of FIG. 1 of 1.0 eV, and an operating temperature of 300 degrees Kelvin. See *Efficiency of Refrigeration using Thermotunneling and Thermionic Emission in a Vacuum: Use of Nanometer Scale Design*, by Y. Hishinuna et al., supra; and *Measurements of Cooling by Room Temperature Thermionic Emission Across a Nanometer Gap*, by Y. Hishinuma, et al, supra.

Figure 6:
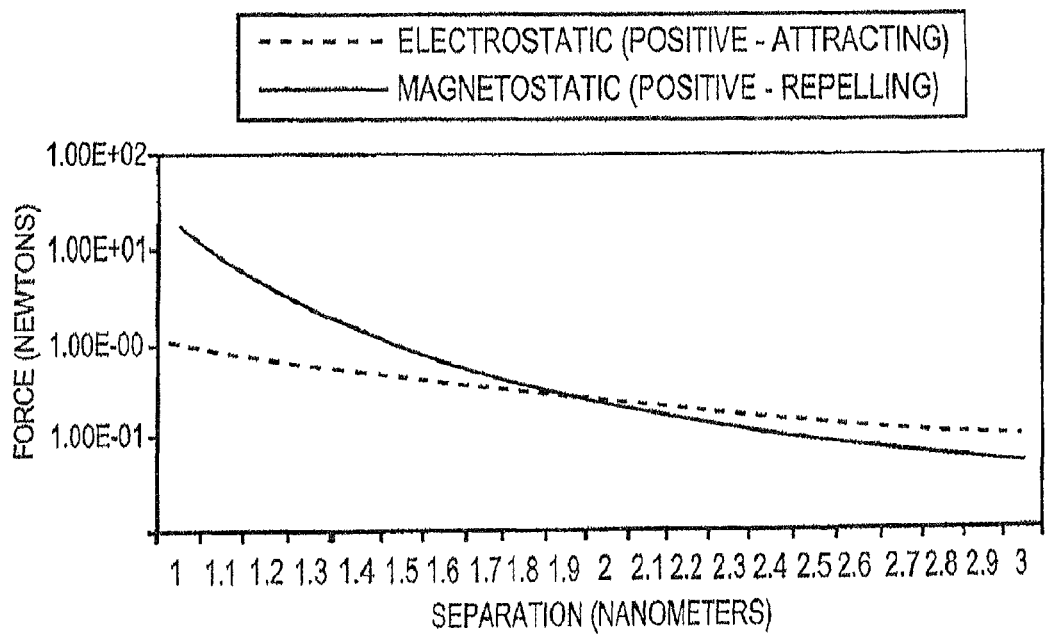
FIG. 6 is a graph quantitatively illustrating interacting forces in the devices of FIGS. 1, 3 and 4 using polished metal electrodes.

In FIG. 6 the force functions $F_m$ and $F_e$, for the values listed above are plotted, with a logarithmic scale, on the Y axis vs. the electrode separation gap d, with an arithmetic scale, on the X axis. This plot produces a graph like FIG. 5 only now it is fully quantified. The stable equilibrium point 45 is close to 2.0 nanometers, which is in the desired spacing range to achieve a tunneling current of 20 amperes, according to Hishimuna. See *Measurements of Cooling by Room Temperature Thermionic Emission Across a Nanometer Gap*, by Y. Hishinuma et al., supra. As disturbances try to shift the spacing gap away from the stable equilibrium in either direction, the restoring forces are greater than 0.2 Newton, which is sufficient to overcome the bending resistance of the flexible electrode and push it back to its equilibrium position.

With the emitting electrode at room temperature, a current flow of 20 amps, and a voltage of 0.15 volts, the device can achieve either an electrical power generation capacity or a refrigeration capacity of 16 watts, which is computed as the current (I) times the Peltier coefficient of 0.8 used in this example as described in *Measurements of Cooling by Room Temperature Thermionic Emission Across a Nanometer Gap*, by Y. Hishinuma, et al., supra. The resistance power lost in the flow of this current through flexible electrode 1 is $I^2rL/tw$. With the values mentioned above, the ohmic power loss calculates at 1.0 watt, which is assumed to be manageable both as a power loss and as a source of heating electrode 1. Heat transfer from electrode 2 to electrode 1 can also take place by radiation, convection and conduction, but is estimated to be no more than 1.3 watt when the chamber of the invention device is evacuated to a level of 0.06 mm Hg of argon gas. Finally, there is an electrical heat generated in electrode 2 as described in *Measurements of Cooling by Room Temperature Thermionic Emission Across a Nanometer Gap*, by Y. Hishinuma, et al., supra, which is equal to the voltage V times the current I, or about 3.0 watts in this example. The remaining available energy from the 16 watts of converted energy is 10.7 watts. This corresponds to a calculated efficiency of 67 percent.

So, we see that the system level characteristics of this device, based on established electromagnetic theory, support a workable design and a means for reducing to practice for a thermo-tunneling converter with high efficiency.

Example 2

Another example of the versatility of this invention is in the choice of materials. The preferred embodiment, as described in Example 1, includes a metal foil as one of the electrodes. Another embodiment could use a single-crystal silicon as the flexible electrode. Although silicon is not normally regarded as a flexible material, it is routinely fabricated in the industry with a roughness of 0.5 nanometers and a flatness of 1 micrometer across a square centimeter surface. Although silicon is much stiffer than a metal foil as measured by the Young's Modulus, its flatness indicates that very little bending is required to approach ideal flatness. The forces generated by the invention will be shown to be able to bend a silicon wafer by the one micron needed flatten it completely. Overall, using silicon as the base material for the flexible or both electrodes has several advantages: (1) silicon wafers are readily available at low cost, (2) silicon wafers have desirable roughness and flatness characteristics, (3) adding low work function materials or patterns of materials on silicon is readily and frequently performed in the industry, (4) the resistivity of silicon prevents the flexible electrode from reacting too quickly during contact or near contact with the other electrode of the invention, and (5) the desired resistivity of silicon can be arbitrarily controlled through doping, which is also common practice in the industry. Overall, the invention's design can be built with materials and processes that are routinely available in the semiconductor industry.

Figure 8:
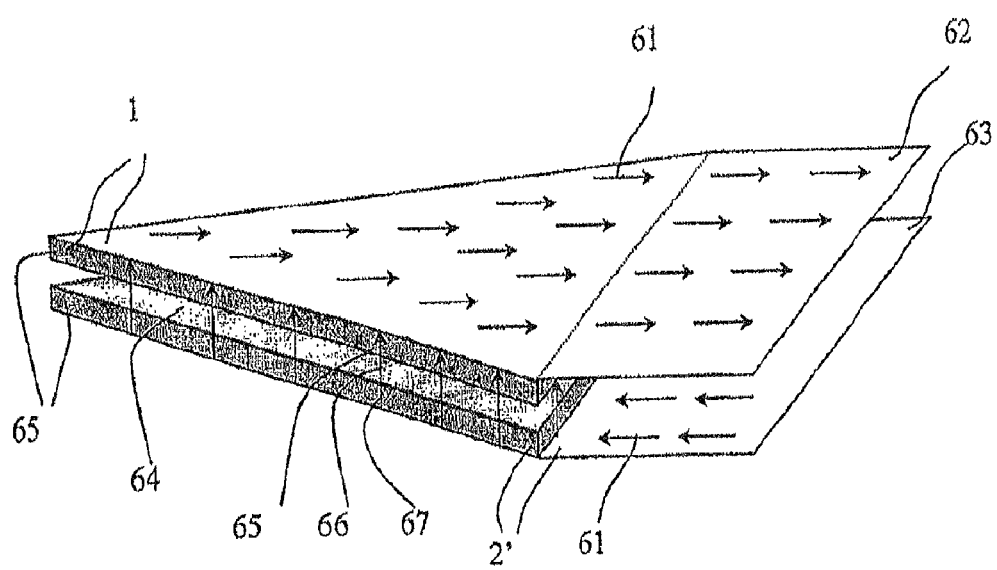
FIG. 8 is a drawing showing how the electrodes may be built from silicon wafer material.

In order to illustrate the example of the invention using silicon for the flexible electrode, consider FIG. 8. Here, electrode 1 is comprised of a foil backing 62 and a silicon substrate 65. The shape of electrode 1 in FIG. 8 is triangular, approximating the optimal exponential shape described in Example 1. The silicon substrate 65 can be cut from a standard wafer and then be bonded to the foil backing 62 of electrode 1 using a conductive adhesive. Electrode 2' in FIG. 8 is constructed like electrode 2 in FIG. 1 only the magnet is not shown and is assumed to be positioned separately. By separating the magnet from electrode 2', it is possible to construct electrode 2' in FIG. 8 using the same materials and process as electrode 1 in FIG. 8. Arrows 61 indicate the directional flow of electrons. Because the foil backing has much higher conductivity than the silicon, the electrons will follow a path of least resistance. Hence, electrons flow from right to left through the foil backing of electrode 2' via conduction, then they flow vertically through the silicon substrate of electrode 2' as indicated by portion of arrow 67, then the electrons flow via tunneling or thermionic emission from surface 64 of electrode 2' to electrode 1 in a vacuum as indicated by portion of arrow 66. Once the electrons reach electrode 1, they again flow through a silicon substrate vertically as indicated by portion of arrow 68 and finally reach the foil backing 62 of electrode 1. Then, they follow a very low-resistance path from left to right through the foil backing 62 of electrode 1. The flow of electrons as indicated directionally by the arrows 61 interact with a magnetic field of a nearby permanent magnet, which is not shown in FIG. 8.

In this example, the total thickness $t_s$ of the silicon is 0.5 millimeter or 0.25 millimeter per wafer, which is an industry standard thickness. The silicon material is doped to have a resistivity $r_s$ of 0.02 ohm-cm, which is also commonly practiced. The Young's Modulus $E_s$ for silicon is known to be 47 Giga Pascals or $4.7\times10^{10}$ Pascals. Silicon wafers are routinely polished in the industry to 0.5 nanometers of surface roughness and achieve a surface flatness $d_x$ of 1.0 micron for a wafer of lateral dimensions of one centimeter.

Figure 7:
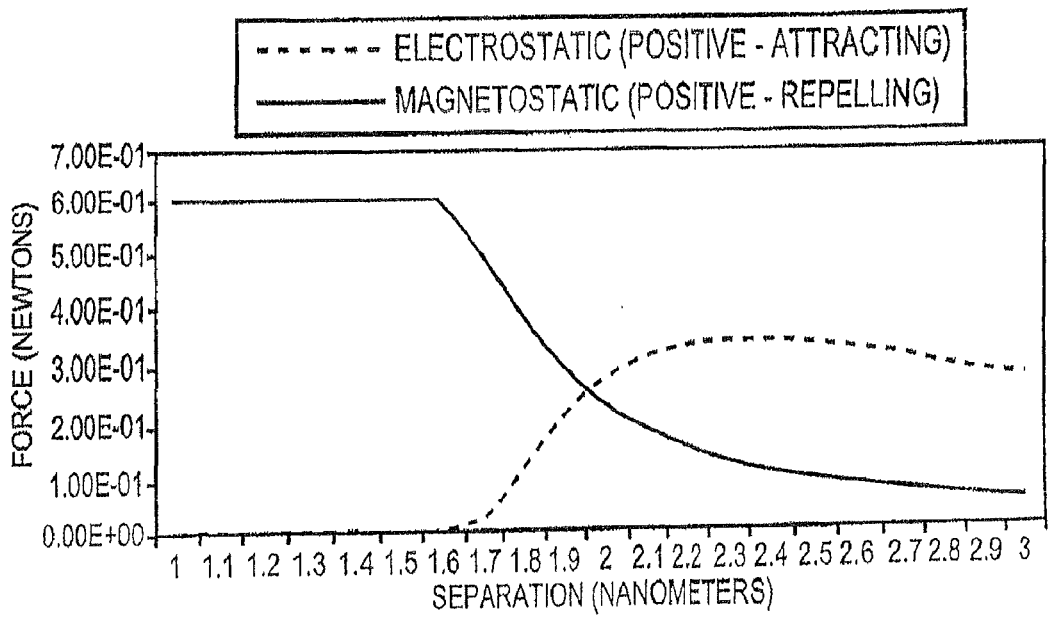
FIG. 7 is a graph quantitatively illustrating interacting forces in the devices of FIGS. 1, 3 and 4 using polished silicon electrodes.

FIG. 7 shows the effect of the silicon on the forces as compared to FIG. 6. The magnetostatic force is limited to 0.6 Newtons as the gap becomes very small. The resistance of the silicon limits the current flow and hence the magnetostatic repelling force. Also, a very narrow gap will cause all of the supply voltage to drop in the silicon resistance, and zero voltage appears across the gap, which means the electrostatic attracting forces are zero for a very small gap spacing.

To quantify these effects, consider the maximum current that can flow in this system, which is the supply voltage V divided by the silicon resistance, which is equal to $r_s t_s/Lw$. For the applied voltage, length, and width of the electrode in the Example 1, the 4 maximum current flow is about 50 amperes when the silicon is present. Furthermore, when the current approaches this 50-ampere level, the supply voltage is all dropped across the silicon and no voltage difference can be achieved across the facing surfaces of the electrodes.

The restoring differential forces in FIG. 7 are relatively large. According the to the figure, a 0.1 nanometer deviation from the desired separation produces a restoring force greater than 0.05 Newtons. This restoring force is much greater than the bending forces required to flatten electrode 1 and much greater than the bending forces required to achieve parallelism with electrode 2, as will now be calculated.

In order to flatten out a one-micron corrugation in electrode 1, a force of 40 $d_x E_s wt_s^3/12\ L^3$ is required. This force calculates to 0.003 Newtons. If electrode 1 and electrode 2 have opposing corrugations, then the required force is twice this amount or 0.006 Newtons, which is much less than the 0.05 Newtons of restoring force available to maintain a gap within 0.1 nanometers of the desired gap.

The force characteristics in FIG. 7 with a silicon electrode material are more desirable than those in FIG. 6 with a metal foil material for the following reasons: (1) the forces with the silicon present do not become so large as to cause oscillations or sudden movement that could damage or destabilize the system as in the case of pure metal electrodes, (2) a silicon wafer's greater flatness versus metal foil allows the system to start out much closer to the desired operating point, (3) the resistance of silicon prevents large currents forming in small localized areas that can result in high temperatures and evaporative damage to the electrode materials, (4) the stiffness of the silicon reduces the amount of movement of the material to sustain the gap over time and hence reducing the risk of fatigue, cracking, or deformation, and (5) the higher stiffness and flatness of silicon insures the gap can be maintained in the presence of local variations which reduces the need for precision in the exponential shape, uniformity of the electrode thickness, and other parameter variations of the materials and design.

Example 3

Figure 9A:
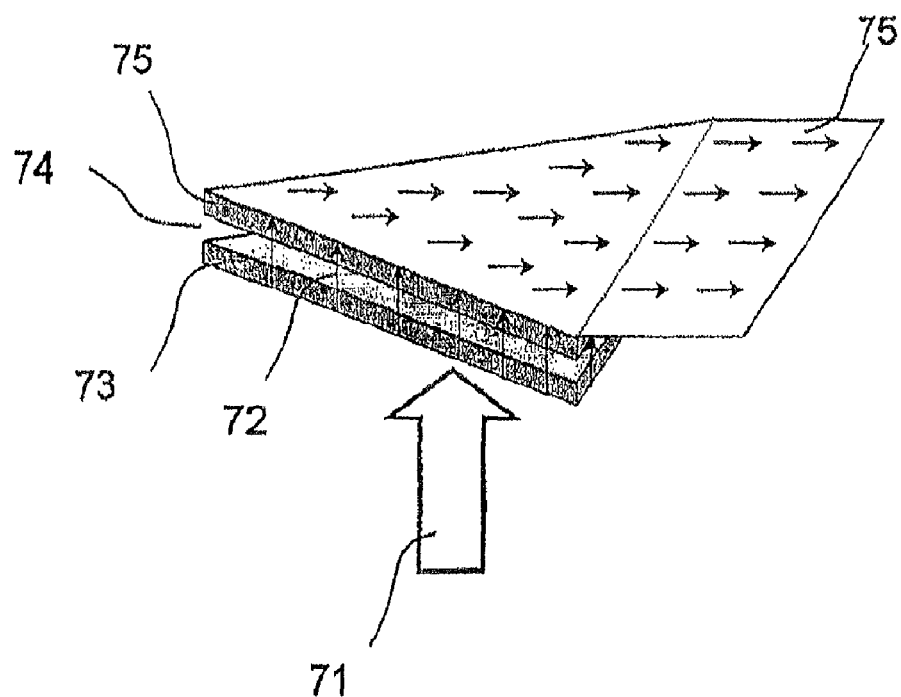
FIG. 9a illustrates an alternative embodiment with a larger gap that is appropriate for thermo-photovoltaic applications.

FIG. 9a shows another example of how this device could be used for a different type of energy conversion called thermo-photovoltaic. In this example, a heat source 71 causes photo-emissive material 73 to begin radiating light illustrated by 72 across a gap 74 that is smaller than the wavelength of the light to photosensitive material 75, which in turn creates an electric current illustrated by arrows 76. In this example, the photo-emissive material 73 could be tungsten or other photo-emissive metal. The photosensitive material 75 could be silicon, selenium, gallium, arsenic, indium or some combination or alloy of these. The required length for the gap 74 is typically less than smallest wavelength emitted by photo-emissive material 73 or about 100 nanometers in order to achieve near-field optical conditions. The photo-emissive electrode 73 in this case is rigid, flat and polished on the gap side. The photosensitive electrode 75 has enough flexibility to flatten out to a largely uniform gap of about 100 nanometers.

Figure 9B:
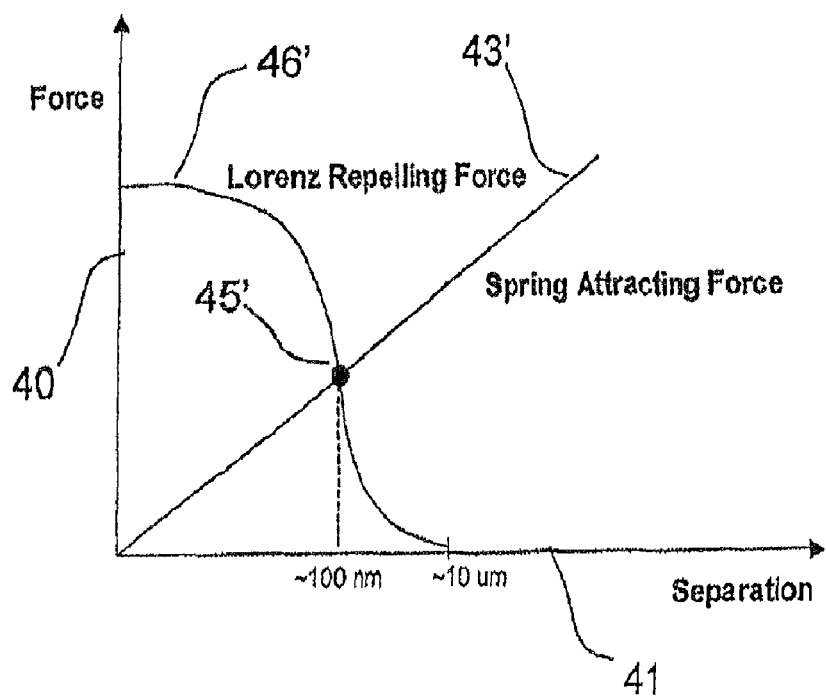

FIG. 9b shows a graph of the forces that can create a stable gap in a thermo-photovoltaic implementation of this invention. Because the electrostatic force is too small at these distances to be significant, a spring force or similar external force can be substituted to cause an attraction between the two electrodes. The spring force has a linear magnitude as a function of gap separation. The balancing repelling force is generated as in the previous examples by the current illustrated by arrows 76 flowing in the presence of a magnetic field, which is not shown in FIG. 9. This current is generated by the photosensitive material receiving photons from the emission of electrode 73, but otherwise serves to create and maintain a uniform gap separation as described in the previous examples. The repelling force 46' in FIG. 9b is proportional the thermo-photovoltaic current whose behavior vs. separation was derived from *Micron-gap ThermoPhotoVoltaics (MTPV)*, by R. DiMatteo, et al, supra.

Example 4

Figure 10A:
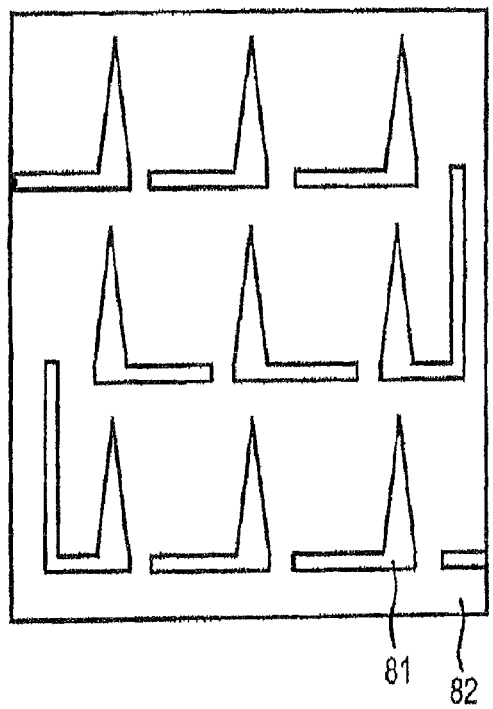
FIGS. 10a-10c show how multiple electrode pairs of FIG. 8 can be assembled simultaneously for mass production using process techniques that are common in the semiconductor industry.
Figure 10B:
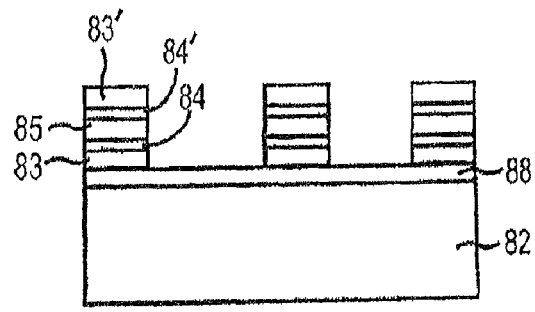
Figure 10C:
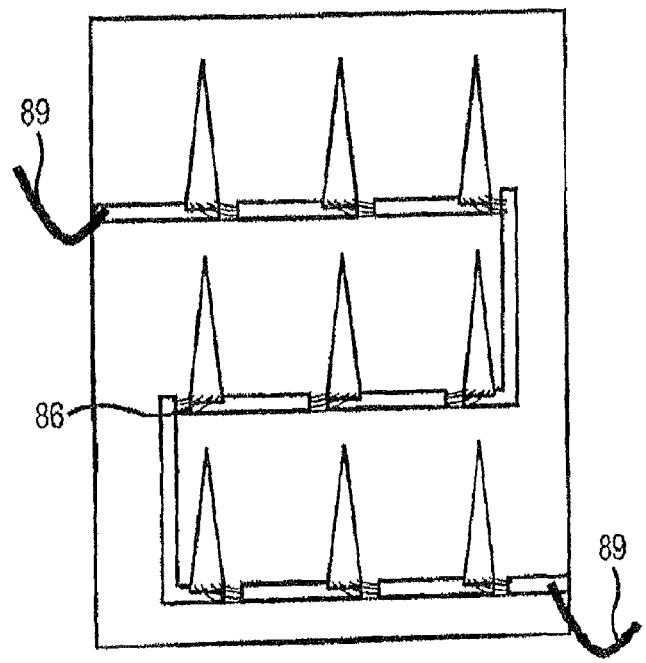

FIGS. 10a-10c illustrate how the design of FIG. 8 or FIG. 9 could be assembled wherein the multiple devices are connected in series electrically and in parallel thermally. Furthermore, FIGS. 10a-10c illustrate how to scale up to multiples of these devices using manufacturing techniques that are widely used in the semiconductor industry. FIG. 10a shows a base substrate 82 that holds one side of multiple devices. This substrate 82 is cooled when the device is operating as a thermo-tunneling cooler, or is heated when operating as a heat to electricity converter, or is radiating when the device is operating as a thermo-photovoltaic converter. FIG. 10b shows a side view of the film stacks that may be created to manufacture multiple devices on one substrate 82. Substrate 82 is made of silicon, silicon carbide, aluminum, gallium arsenide or similar substrate material used in commonly in the industry. Layer 88 is an oxide or similar film that electrically insulates the first metal layer 83 from the substrate layer 82 but still allows for thermal conduction. First metal layer 83 is a highly conductive, and relatively thick layer for carrying current for thermo-tunneling operation or for carrying heat for thermo-photovoltaic operation. Layer 83 can be copper for example, or a less expensive metal like aluminum. Gap layer 84 is the metal or other film that is best suited to interface to the gap. In the case of thermo-tunneling, this layer 84 could be gold to protect from oxidation and contamination, as gold is an inert metal. In the case of thermo-photovoltaic operation, gap layer 84 could be tungsten or other material that is highly photo-emissive in order to maximize the conversion of heat to photons that traverse the gap. Layer 85 is a sacrificial layer that is later removed after the film stack of layers 83, 84, 84', and 83' are produced. The sacrificial layer provides a structure to lay down additional films that comprise the second electrode. After removal of sacrificial layer 85, the gap is formed between layers 84 and 84' by the previously described force balance of FIG. 5, 6, 7 or 9b. Layer 84' is optimized to receive the energy from the gap and to protect layer 83' from contamination or oxidation. In the case of thermo-tunneling operation, layer 84' could be made of gold. In the case of thermo-photovoltaic operation, layer 84' could be a photosensitive material described as material 75 in FIG. 9a. Layer 83' is the current carrying layer that carries current out of the device, and its material could be copper or aluminum. Once the film stack shown in FIG. 10b is created using semiconductor processing, the series electrical connections are made as illustrated in FIG. 10c. In this case, electrical connections are made from the top electrode to the neighboring substrate electrode using wire and wire bonds 86. Wires 89 indicate the electrical input and output to the multiple devices. Sacrificial layer 85 can be made of any material that can be removed with a processing liquid, gas, or by melting or evaporating it out with heat.

Figure 11A:
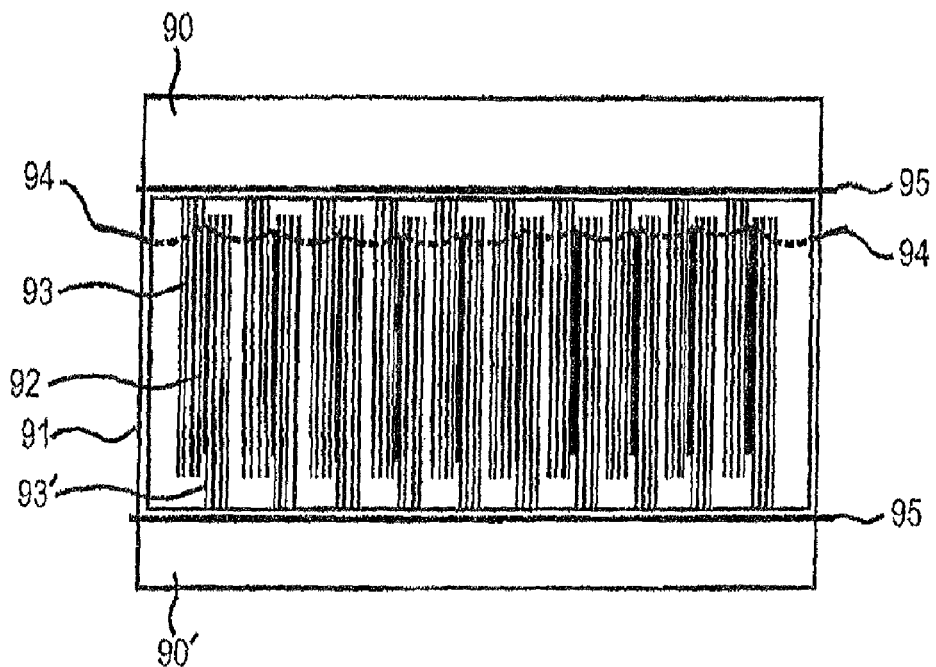
FIGS. 11a-11b show how multiple electrode pairs of FIG. 8, 9a or 10c can be packaged into a large heat exchanger to achieve higher density and capacity of the device function.
Figure 11B:
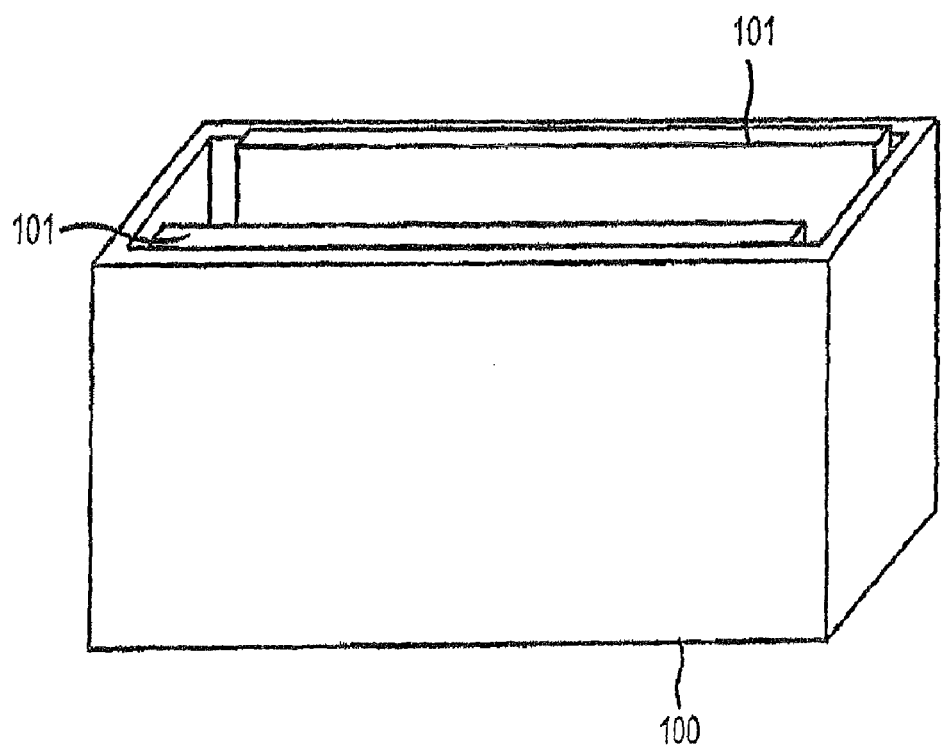

Once a pair of devices is created as shown in FIGS. 8, 9a, or 10c, then they can be inserted into a heat exchanger package as illustrated in FIG. 11a, for example. Here, the electrode pairs or arrays of electrode pairs 92 move heat from one fin 93 to corresponding fin 93'. Fins 93 are all physically connected to first thermal plate 90, and corresponding fins 93' are all connected physically to second thermal plate 90'. Thermal plates 90 and 90' represent the hot side and cool side for thermo-tunneling or thermo-photovoltaic operation by aggregating together the smaller hot sides 93 and smaller cool sides 93', respectively. Thermal plates 90 and 90' are made from a material with high thermal conductivity such as copper, aluminum, or silicon. Rectangular tube 91 provides the walls for the sealable container and is made from a material with low thermal conductivity, such as glass, Teflon, polyimide or similar material with sufficient compressive strength. The low thermal conductivity allows for thermal isolation of the hot and cool plates 90 and 90' enhancing the effectiveness of the system. If plates 90 and 90' have mismatched thermal expansion characteristics relative to the tube walls 91, then interface material 95 could be made of a soft vacuum-compatible rubber like Viton, or Teflon, polyimide or similar material used to make o-rings in the industry for these types of seals. If the thermal expansion characteristics of thermal plate material 90 and 90' and tube wall material 91 are approximately equal, then the interface material 95 could be a hard bonding material like glass frit, epoxy, solder, or weld. FIG. 11b shows how to build a magnet structure that surrounds the heat exchanger package of FIG. 11a and supplies the magnetic field needed to form the gaps in electrode pairs 92 of FIG. 11a. Permanent magnet 101 is fixed in a rectangular ring of a magnetically permeable material 100. Permanent magnets 101 could be made from standard materials used for magnets such as alloys of iron, cobalt, nickel, neodymium, boron, and aluminum. Typically, this alloy is sintered into small particles and then repacked into the desired shape with a binder material in order to achieve a high remaining magnetization when magnetized. Rectangular ring 100 could be made from the same steel used in transformers to maximize magnetic permeability and the magnetic field produced by the permanent magnets 101. Such material can be iron-rich steel, or some other alloy of iron, cobalt, nickel, chromium, and platinum, for example.

Figure 13:
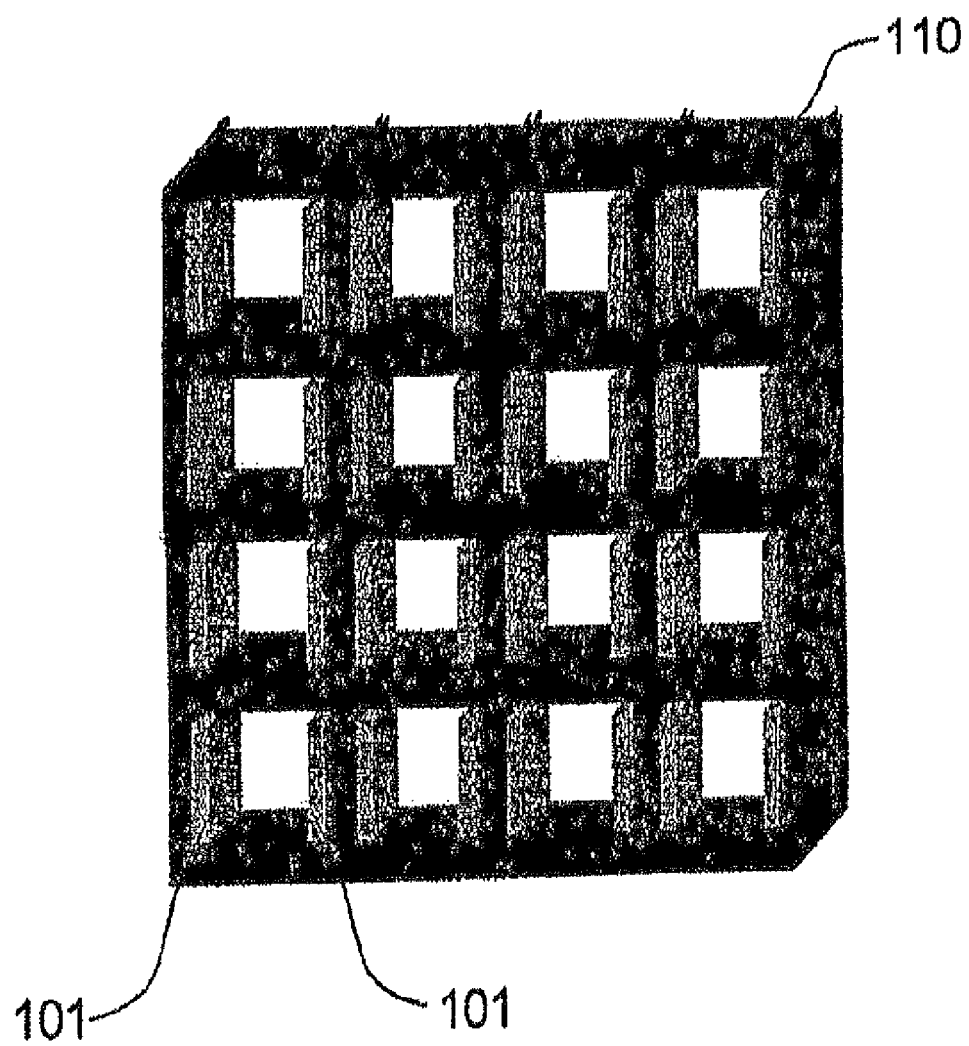
FIG. 13 shows an array of permanent magnets attached to a magnetically permeable grating in order to make a larger device from the smaller devices of FIG. 8, 9a, 10c, 11a or 12b.

FIG. 13 shows how the magnet assembly can be scaled up to accommodate an array of heat exchangers. Magnetically permeable material 110 is arranged in a grating structure with an array of voids to insert devices shown in FIG. 8, 9a, 10c, or 11a. Permanent magnets 101 are inserted in each cell to produce a magnetic field in between the magnets.

In a highly miniaturized fabrication process, the magnet array of FIG. 13 could be built on top of the substrate of FIG. 10c and arranged such that the electrode pairs of FIG. 10c are contained in the voids of the magnet arrays of FIG. 13. In this case of miniaturization, the permanent magnets 101 and permeable material 110 could be grown as metal films of the materials mentioned using standard processes like evaporation, sputtering, or plating directly onto the substrate similar to the construction of the electrode films in FIG. 10b.

Figure 14:
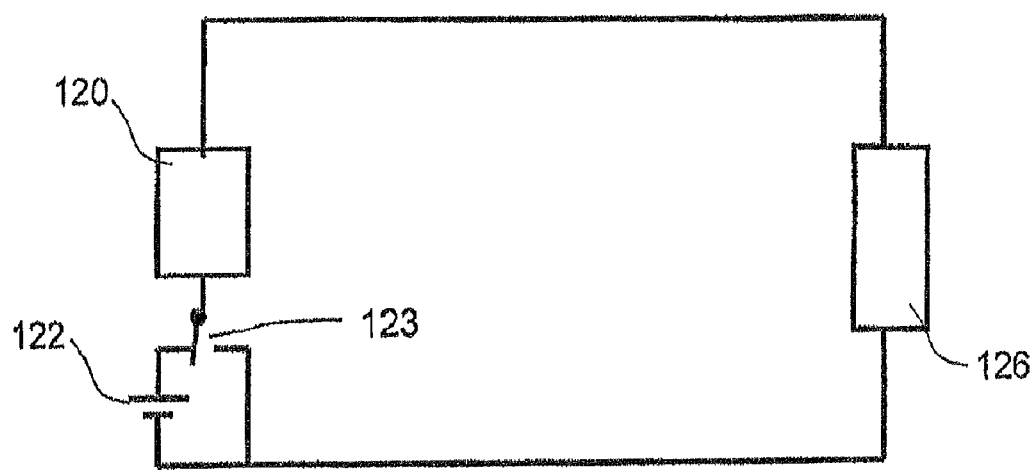
FIG. 14 is one example of a start-up electronic circuit that can be used to form the gap in the device of FIG. 8, 10c, 11 a or 12b prior to applying heat energy for the embodiments wherein electricity is generated.

FIG. 14 illustrates an additional electrical circuit that might be needed when the device of FIG. 8, 10c, or 11a is operating as a thermo-tunneling converter of heat to electricity. Because the device of this invention 120 requires an electrical current to be flowing in order to achieve the gap formation, the gap is not present prior to a current flow. In FIG. 14, an external power source 122 provides a current flow that can be used to form the gap in device 120. Once the gap is formed and heat is applied to one electrode, then a temperature difference is created relative to the other electrode. Once this temperature difference is present, then thermo-tunneling of hot electrons will begin to flow, creating additional current flow. Once the thermo-tunneling current is flowing, it alone can maintain the gap in device 120 as described previously. Now, the external power source 122 is no longer needed and it can be switched off by switch 123. Hence, the circuit of FIG. 14 is a startup circuit for thermo-tunneling conversion of heat to a power source for an electrical load 126. Switch 123 can reapply external power source 122 whenever the heat source is removed and is subsequently re-established.

Example 5

Figure 12A:
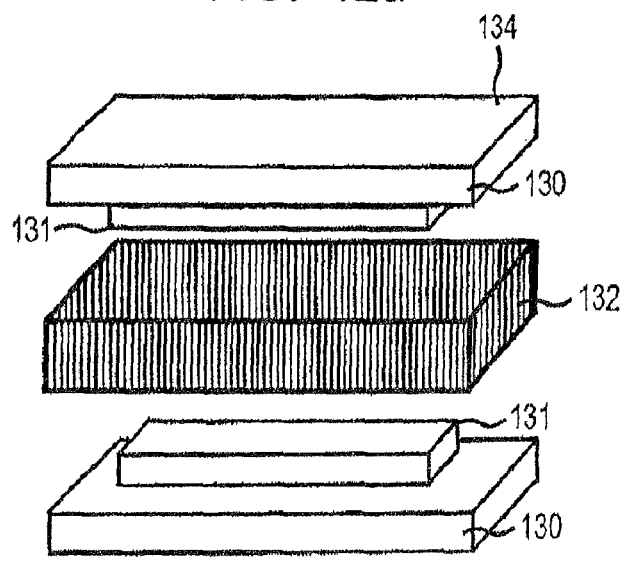
FIGS. 12a-12b illustrate how the electrode pair of FIG. 8 may be packaged using silicon, glass, glass-frit vacuum sealing, and other standard micro-electro-mechanical (MEMs) packaging techniques that are common in the industry.

FIG. 12a shows another example for packaging the electrodes of this device that is similar to how micro-electromechanical systems (MEMs) are packaged when a vacuum environment is required. The top and bottom thermal plates 130 can be made of silicon and can be cut from standard silicon wafers. Silicon has a high thermal conductivity and hence is well suited for the thermal path of this device. The wall of the package 132 is made of glass, which has a low thermal conductivity but a thermal expansion coefficient that is close to that of the silicon thermal plates 130. Because glass and silicon have similar thermal expansion characteristics, then it is possible to use the well-known glass frit bonding method between 130 and 131. Glass frit bonding is typically used to bond two glass pieces together, but can also bond glass to silicon since a glass silicon dioxide layer naturally forms on silicon surfaces exposed to air. The result is a very hard and tight seal between the glass and silicon that can easily withstand the pressure of a vacuum. Similar vacuum packages are used in the MEMs industry for accelerometers, oscillators, and high frequency switches. Pedestal layer 131 is also made of silicon and can be bonded to thermal plate 134. Metal layers 134 on the top and bottom thermal plates 130 are used to make an electrical connection to the electrodes inside the package without requiring through-holes or other mechanisms that limit the life of light bulbs and other vacuum products.

Figure 12B:
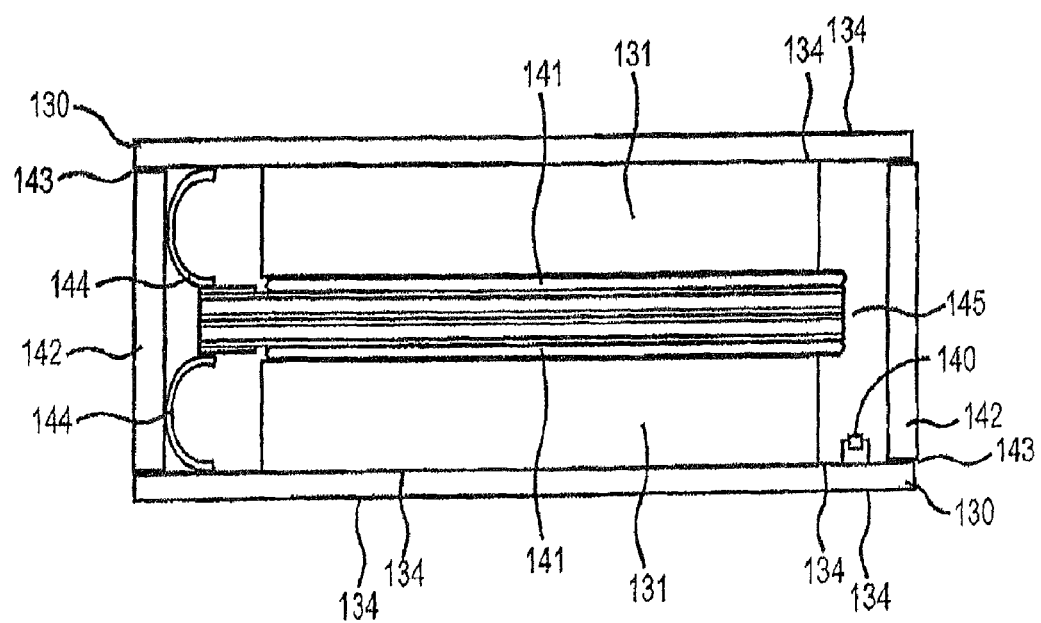

FIG. 12b shows how the electrodes might be contained within the vacuum package of FIG. 12a. The electrode pair 145 corresponds to FIG. 8, 9a, or 10c. Thermal interface material 141 conducts the heat to or from each electrode to the outside of the package and also provides a soft layer for the electrodes to move against during operation. Examples of thermal interface material 141 are gap pad from Bergquist Corporation, vacuum grease from Apiezon or Dow Chemical, carbon nanotube compounds and mixtures from MER Corporation or other soft materials mixed with thermally conductive particles. Bonding material 143 bonds the glass wall to the silicon thermal plates and examples of this material are epoxy and glass frit. Wires 144 connect the base of the electrodes to the top and bottom plates. Example materials for the wires are flat foil or cylindrical wire made of copper, aluminum, or other electrically conductive material. Copper layers 134 allow for current to flow widely across the resistive silicon plates 130. The silicon plates might be doped with Boron, Arsenic, or similar element in order to increase its electrical conductivity and minimize the resistive losses of the current flow into the package. Getter filament 140 heats up when a voltage is applied to its copper pads 134 much like the filament in a light bulb. A suitable material like Cesium chromate is coated on the filament 140 to allow for the release of Cesium vapor into the vacuum package. The Cesium vapor accomplishes the following functions once released: (1) evacuating the remaining air and other gases inside the package after sealing by reacting with these gases to produce solids, (2) removing gases that leak into the chamber over the life of the device by reacting similarly, and (3) to naturally form a Cesium monolayer or sub monolayer on the gap-facing surfaces of electrodes 145 and thereby produce a low work function layer to encourage emission of electrons across the gap.

Alternatively, as shown in FIG. 12c the wire filaments 134a include connectors 300 that are electrically routed through the doped silicon sides to eliminate wire holes and feed-throughs. The filaments 134a preferably are connected in parallel electrically with the device and are designed to open its circuit after the alkali metal is evaporated.

Other Examples Using Magnetic Force Distributions

The above basic examples indicate how a working thermo-tunneling system can be designed to achieve cooling or power conversion. Other examples are easily designed by altering one or more of the parameters used in Examples 1 and 2 above. The gap distance can be increased by one or more of the following changes: (1) increasing the magnetic field, (2) decreasing the voltage, (3) increasing the current flow, (4) increasing the length of the flexible electrode, or (5) decreasing the area of the flexible electrode. The gap distance can be decreased by making the opposite changes.

It should be noted that several of the features described herein may not be necessary or can be achieved without additional manufacturing complexity. Because the industry has not been able to produce a working thermo-tunneling converter larger than nanometer dimensions, the actual behavior at a larger scale is not known. For example, referring again to FIGS. 1a-1b, the low work function layer 5 may not be necessary if the gap can made slightly smaller. The enhancing material 5 might be just as easily accomplished by the surface roughness after polishing, which naturally produces the peaks and valleys that are known to enhance electron emission. The resting tip 6 also may not be required given the choice of resistive materials for electrode 1 or 2. The electrode patterning in FIG. 2a, which also provided peaks and valleys to reduce the electrostatic force, might also be achieved by natural surface roughness after polishing. Finally, the vacuum chamber 20 may not be required if the tunneling process has been demonstrated experimentally in an air gap. In addition, the exponential shape of electrode 1 may be approximated by an easier to manufacture triangular shape. All of these complicating features (tip 6, layer 5, enhancing material 5', patterning in FIG. 2a, the curved shape of electrode 1, and vacuum chamber 20) were included in this disclosure for completeness in describing what might be required in final production.

The devices disclosed herein are versatile in building various types of electronic junctions for the electronics industry that requires a uniform gap between electrodes. For example, a thermoelectric device having poor thermal insulation between the hot side and cool side could employ the present disclosure. A vacuum spacing on top of a thermoelectric stack could provide better thermal insulation, and this disclosure provides a means for accomplishing this gap either independent of or in combination with thermionic or thermo-tunneling methods.

A final comment on the ease of manufacturing of the devices disclosed herein involves a discussion of other natural forces that arise when two very smooth surfaces are brought together. Two attractive forces known to hold smooth surfaces together are Casimir forces and Van Der Waals forces. These forces are strong enough to hold the two electrodes of this invention together prior to applying a voltage, but they are not expected to be so strong as to affect the desired interaction and dominance of the electrostatic and magnetostatic forces as described during operation of the invention. However, these Casimir and Van Der Waals forces can assure that the two electrodes are in full surface contact prior to turning the device on with an applied voltage. In this case, the invention's operation merely needs to separate the two electrodes by a few nanometers. These Casimir and Van Der Waals forces also help eliminate the need for insulating layer 4 of FIG. 1, further simplifying the invention's design.

Multiples units of this device can be connected together in parallel and in series in order to achieve higher levels of energy conversion or to match voltages with the power supply or both.

Laboratory and Simulation Results for Magnetic Force Embodiments

The electrode configuration of FIG. 8 was assembled in a microelectronics lab with copper as the foil backing, and this electrode pair was placed inside of a magnet structure like that shown in FIG. 11b. Thermocouples were attached to each electrode to produce a voltage that is proportional to temperature, and the entire apparatus was placed in a vacuum chamber that was pumped to 1E-3 Torr of vacuum pressure. When the electrode pair was activated by an external power supply with 1.1 amperes, a relative temperature difference of 3.0 degrees was observed between two electrodes, with the cooler side being the side that was emitting electrons. This same relative temperature difference observed as being removed when any of the following actions were taken: (1) replacement of vacuum with nitrogen at atmospheric pressure, (2) deactivation of the chip by disconnecting the external power supply, or (3) reversing the current flow to increase the attractive contact force between the electrodes instead of forming a gap. It is presumed that each of these three actions removed the thermo-tunneling effect. Computer simulations of the electromechanical system of this apparatus as well as observed electrical characteristics of the electrodes also were consistent with this design successfully creating a thermo-tunneling gap.

Example 7

Curved Electrode Design

Figure 15A:
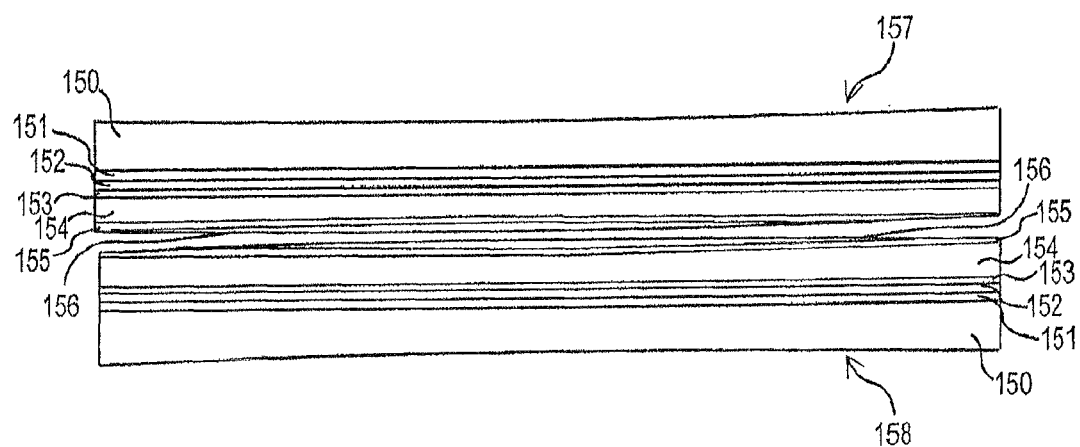
FIGS. 15a-15b illustrate a second embodiment wherein an electrode is curved by a bimetal configuration. and a small contact area occurs at the center; FIG.

FIG. 15a illustrates another design that can achieve a large tunneling area for thermo-tunneling, thermo-photovoltaic, or thermoelectric applications. In this design, one of the electrodes 157 is shaped to have a slight convex curvature, and the other electrode 158 may be flat or convex. Such a curvature is easily achieved by having a combination of material layers bonded together that have differing thermal expansion coefficients, also called a "bimetal" arrangement. When the two materials are bonded together at a different temperature than the operating temperature, the differences in thermal expansion of the materials causes a curvature of the stack. Without limiting the scope of this invention, FIG. 15a shows an example of a thick bimetal metal layer 150 bonded to a copper film 152 using a solder paste 151. The copper film 152 may be deposited through evaporation or sputtering on top of a Titanium adhesive layer 153 which is deposited similarly on top of a silicon substrate 154. On the gap side of the silicon substrate is another Titanium adhesive layer 155 and then a final gap facing layer 156 that could be gold combined with a Cesium monolayer or similar material for a thermo-tunneling application, a material with a high Seebeck or Peltier coefficient for a thermo-electric application, or a photosensitive or photo-emissive material for thermo-photovoltaic applications.

Figure 15B:
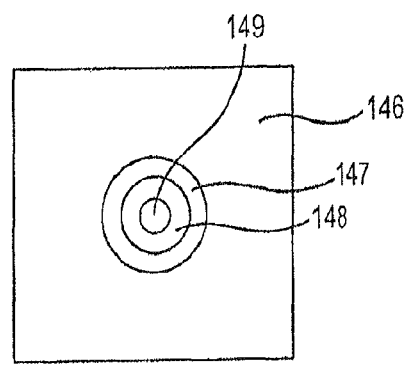

FIG. 15b illustrates the circular areas that result from the curvature when the two electrodes are brought together. First inner area 149 is the area of physical contact, which typically must be minimized or eliminated in thermal transfer applications to prevent heat flow from the hot side to the cold side. Second inner area 148 represents an electron tunneling area where electrons below the Fermi level are able to traverse the gap in response to an applied voltage or to thermal excitation. This area typically needs to be minimized for thermo-tunneling and thermo-photovoltaic applications, but can still serve to reduce the thermal conduction due to phonons if gap facing layer 156 is a semiconductor which typically exhibit low electron thermal conductivity but high lattice thermal conductivity due to phonon motion. Third inner area 147 represents an electron tunneling area for electrons above the Fermi level. These electrons typically facilitate the desired heat transfer for thermo-tunneling applications and can also assist thermoelectric applications by providing a heat transfer mechanism in addition to that produced by the Seebeck and Peltier effects. Outer area 146 represents an area where electrons essentially do not traverse, but photons can traverse via radiation. This outer area of photon-only transfer facilitates thermo-photovoltaic effects, but is detrimental for thermoelectric and thermo-tunneling effects because it allows radiation heat transfer from the hot side to the cold side, particularly during high temperature applications like power generation.

In the following discussion, we will show how this versatile curved electrode invention can be improved by adding a separating force that reduces or eliminates contact area 149, the existence of which is detrimental for all thermal applications. However, it is also noted and claimed that the design of FIG. 15 has great utility even without separation of the contact area. For example, in a thermoelectric application, great efforts are made to maximize the electron flow and minimize the phonon flow across the junction. In most of the prior art designs of thermoelectric devices, all of the junction area permits heat as well as electricity flow. In the improved design of FIG. 15, only the contact area 149 permits total heat flow due to both phonons and electrons, the second inner area 148 permits only electron heat flow, and the third inner area 147 improves the thermoelectric effect with some thermo-tunneling effect. Note how in this configuration, the entire areas 149, 148, and 147 are available for electricity to flow. Hence, FIG. 15 shows a significant improvement in having electricity flow over a larger area than heat flow to improve thermoelectric designs.

For thermo-photovoltaic and thermo-tunneling applications, it may also be desirable to keep the contact area 149 in return for a lower cost design that does not require dynamic gap control or even a vacuum.

The curved electrode system of FIG. 15 may be placed in a vacuum chamber with any gap-forming actuator 160 as illustrated in FIG. 16. Here, the other electrode may or may not also have an actuator 161. The vacuum chamber is constructed similarly to FIG. 12b with glass walls 142 and silicon top and bottom 130. The copper films or plates 134 serve to bring power to or remove power from the device, depending on the mode of operation. Copper wires 163 and solder 162 connect the electrodes to the inner plates or films.

Example 8

Curved Electrode Design with Lorentz Force Separation

Figure 17:
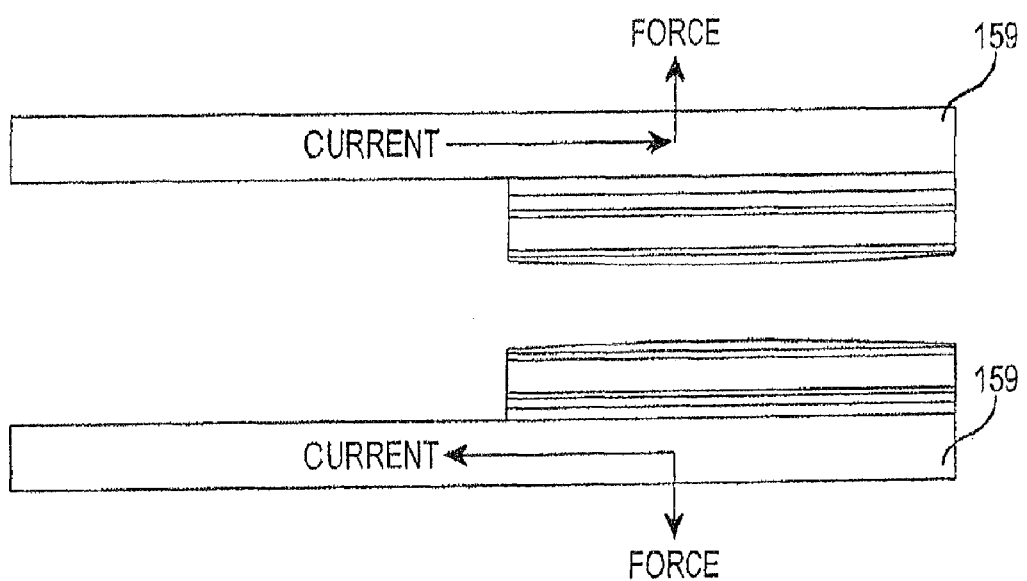
FIG. 17 FIG. FIG. shows an electrode device according to the bimetal embodiment of FIGS. 15-16 with a motion capability to separate the contact center point using a magnetic Lorentz force actuator, achieving a center-point gap.

FIG. 17 shows how the gap forming actuator 160 in FIG. 15 can be constructed using the Lorentz force acting on current flowing in extended plates 159 in the presence of an applied magnetic field (not shown). Because the currents in the two extended plates 159 flow in opposite directions, a repelling force is created between the two electrodes that can balance with Van der Waals, electrostatic, spring, and other attractive forces as described in previous embodiments.

Example 9

Curved Electrode Design with Thermal Expansion Force Separation

Figure 18A:
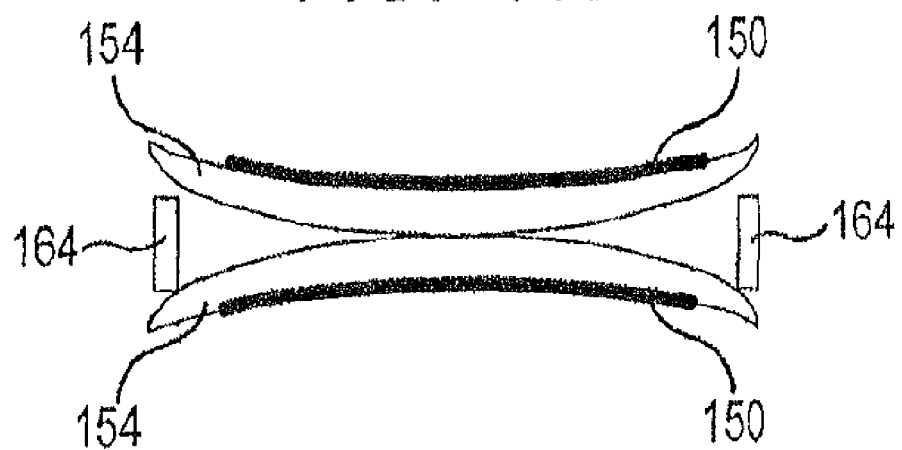
FIGS. 18a-18c FIG. FIG. show an electrode device according to the bimetal embodiment of FIGS. 15-16 with a motion capability to separate the contact center-point using an edge support.
Figure 18B:
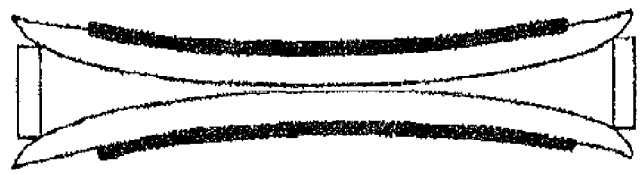
Figure 18C:
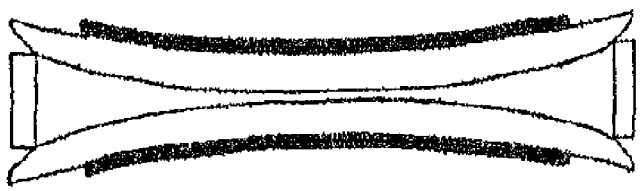

FIGS. 18a, 18b, and 18c illustrate different states of operation for a thermal actuator functioning as a gap forming actuator shown by 160 in FIG. 15. In this example, the bimetal materials 150 and 154 have differing thermal expansion coefficients. Supports 164 are in place on the edges of the electrodes to provide a contact point against which the bimetal force can push to form a gap in the center.

Initially the device is in the state illustrated by FIG. 18a. Here, the center-points of the two electrodes are in contact similar to the design of FIG. 15. As the device is turned on, then heat will build up on one or both electrodes, which will cause at least one of the electrodes to flatten out. The heat for this process can come from electrical resistance or heat transfer from any of thermoelectric, thermo-tunneling, or thermo-photovoltaic effects or can combination of these. FIG. 18b shows the state where the electrode flattens out to the extent needed to form the desired gap. Here, the gap is formed in the center. If any disturbance causes this flattening process to form a larger than desired gap, as illustrated in FIG. 18c, then the tunneling current will diminish or stop, reducing the electrode temperature and increasing its curvature, and naturally restoring to the state of FIG. 18b. As described, this device will automatically form and maintain a desired gap with the advantages of previous embodiments of not requiring arrays or actuators, multiple control systems, lossy spacers, or conforming surfaces.

Figure 19A:
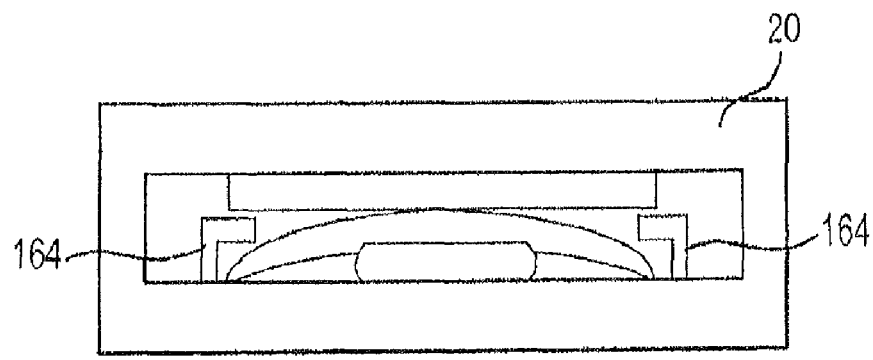
FIGS. 19a-19c FIG. show the devices of FIGS. 18a-18c, respectively, placed inside of a vacuum chamber or other housing and to prevent thermal contact except through the outer container.
Figure 19B:
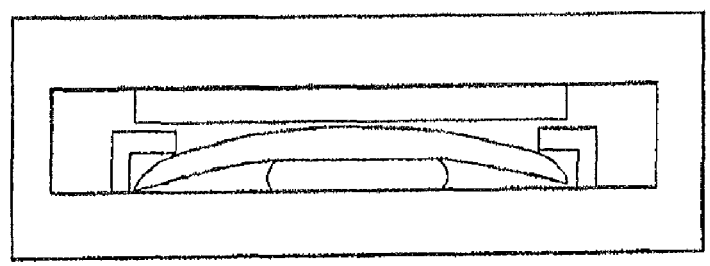
Figure 19C:
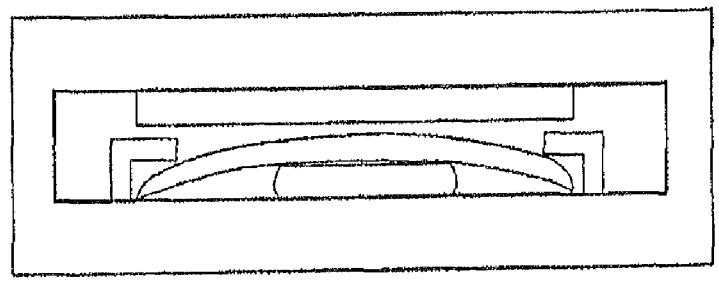

The supports 164 in FIG. 18 are configured such that they can become a significant source of undesirable heat transfer from the hot side to the cool side. FIG. 19 shows an improved configuration wherein the supports 164 do not create a short thermal path from one side to the other, and the thermal path is lengthened to be through the walls of the vacuum chamber 20.

Figure 20:
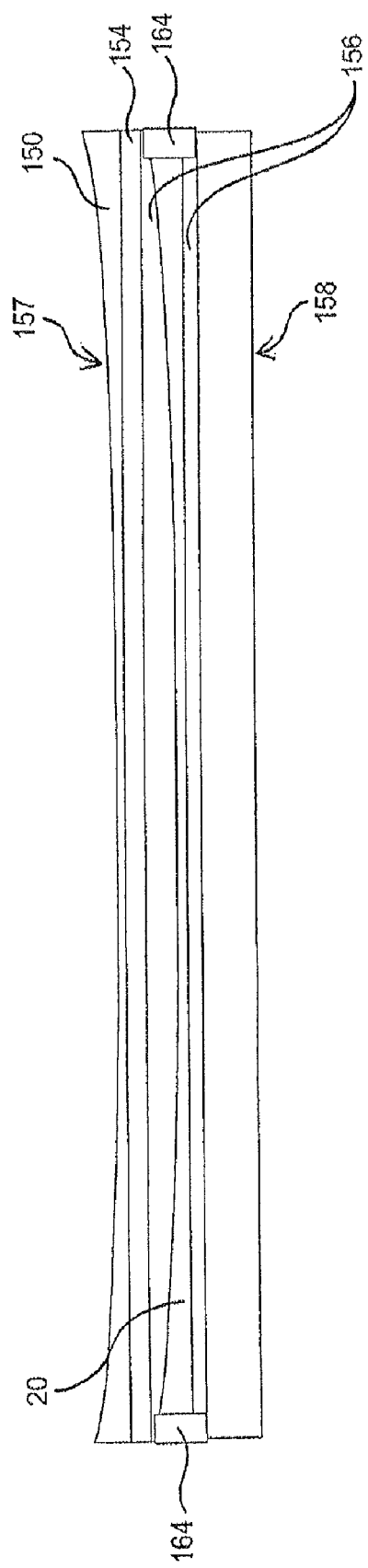
FIG. 20 shows a simplified design of an electrode device according to the second embodiment, wherein the separate vacuum chamber is eliminated by having the gap space be its own vacuum cavity.

FIG. 20 shows how the curved electrodes in combination with the thermal actuator separation means can be simplified further for low cost and ease of manufacturing. In this design, vacuum chamber 20 has the actual electrodes as the top and bottom, and the wall 164 completes the enclosure. In this design, the vacuum pressure from chamber 20 increases the total attracting force that must be balanced by the repelling force of the thermal expansion bimetal formed by differing materials of layers 150 and 154. Layer 156 provides the appropriate material for thermoelectric, thermo-tunneling or thermo-photovoltaic effects. In this diagram, electrode 158 is intended to be the cold side, and the heat moved to the hot side electrode 157 provides the thermal expansion to flatten electrode 157 and form the desired gap at the center-point. The design of FIG. 20 achieves the same automatic gap formation as described 32 for FIG. 18.

Figure 21:
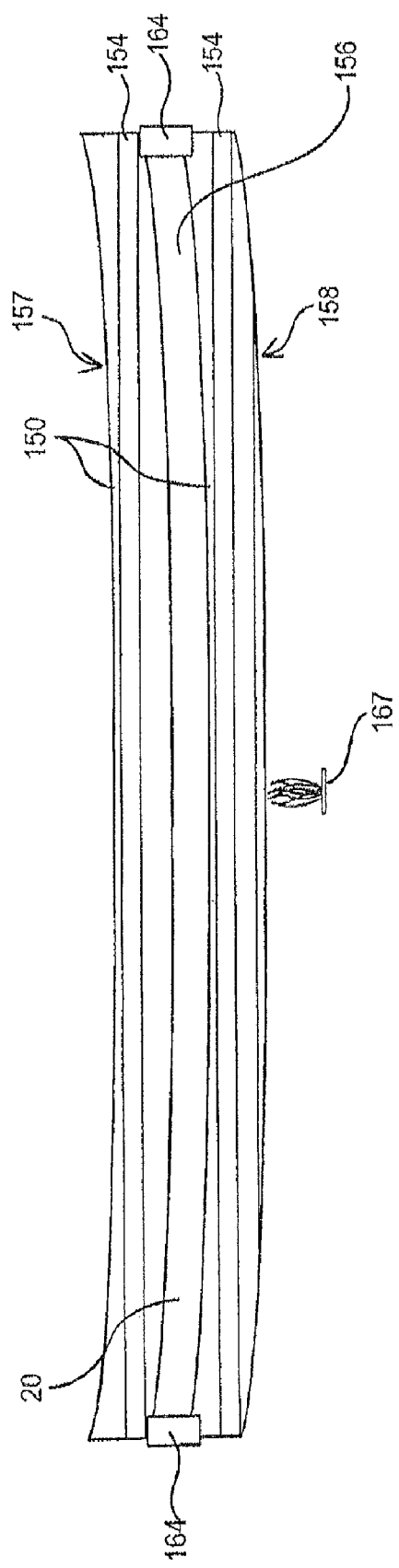
FIG. 21 shows an electrode device with an alternative design to that shown in FIG. 20 that reduces or eliminates physical contact of the gap surfaces to prevent their damage during operation.

The designs of FIG. 20 and FIG. 18 have center-point contact when the gap is not formed or fully formed. For thermo-tunneling systems, this contact may damage the atomic smoothness of the surface diminishing the tunneling after gap formation. In order to prevent this, FIG. 21 shows an alternative design with an external heat source 167 is used to bend electrode 158 towards the other electrode 157. Once the desired gap is formed, then the power to heat source 167 can be reduced to a maintenance only level. Note how, in this process, the physical contact of electrodes 157 and 158 is eliminated to prevent damage to the gap-facing surfaces.

Example 10

Aggregation of Curved Electrode Design

Figure 22:
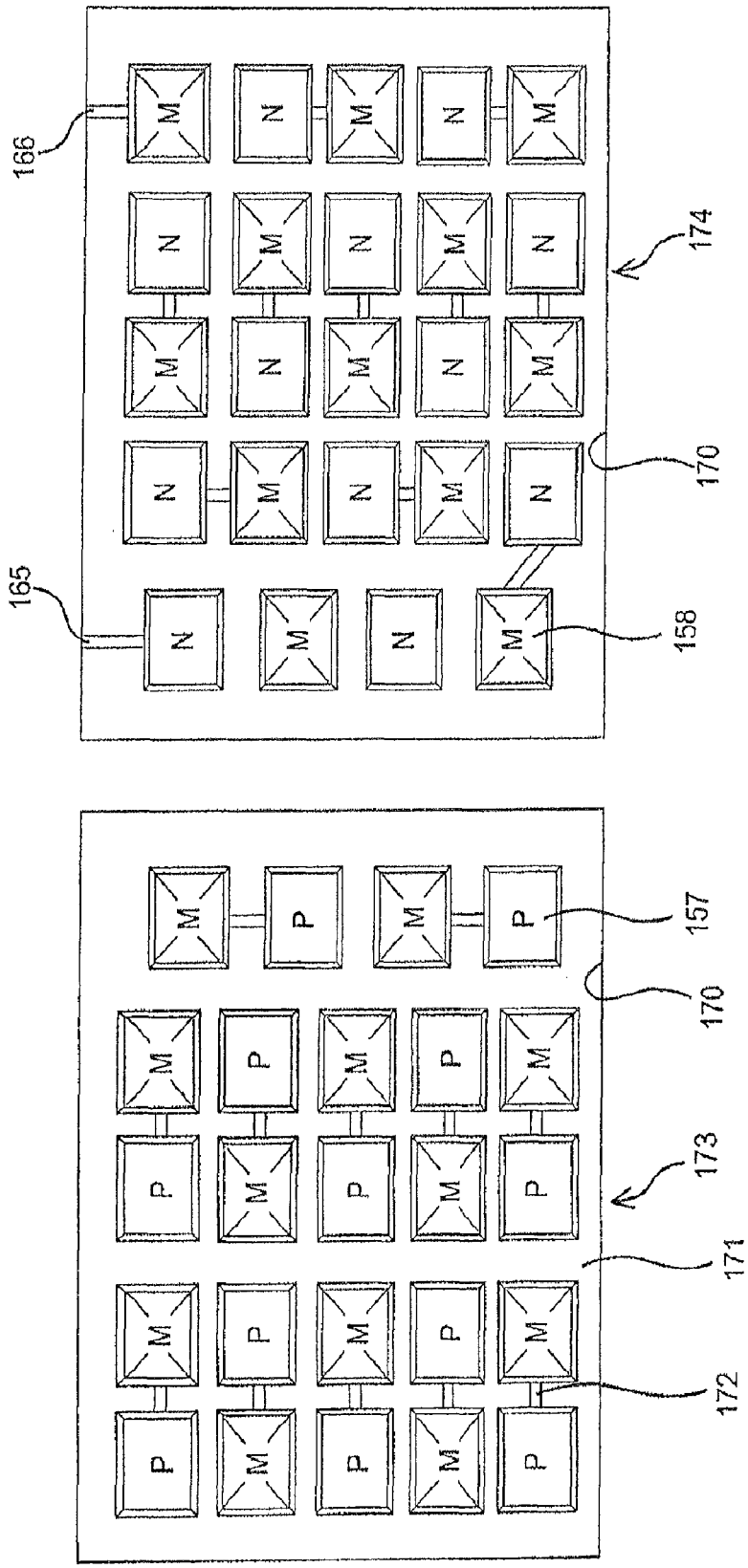
FIG. 22 shows how multiples devices according to the second embodiment FIGS. can be connected electrically in series and thermally in parallel to provide a scaled collection of devices, wherein the electrical connections and the vacuum housing are achieved with flex cable materials; and, FIG. 23 shows a design similar to FIG. 22 using silicon wafer substrates as the vacuum housing.

FIG. 22 shows how a multiple of devices of designs from FIG. 15-21 can be aggregated onto a larger substrate and larger vacuum package. Instead of constructing single devices, each with their own vacuum chamber, this design can aggregate multiple top electrodes of FIG. 15-21 to one substrate 173 and multiple bottom electrodes to another substrate 174. The supports for the electrode pairs (not shown in FIG. 22) can be built onto either top or bottom electrodes 170. The material 171 for the aggregating substrates can be a vacuum compatible material like a polyimide, and the vacuum package can be created by stacking 173 on top of 174 and then sealing their outer edges with a vacuum compatible adhesive. The "M", "P", and "N" indicators in FIG. 22 for electrodes is intended to refer to metal, p-type, and n-type respectively for a thermoelectric application. An arrangement of all p-types on 173 and all n-types on 174 would also create a aggregating thermoelectric design. For thermo-tunneling, one side would be emitters and the other side collectors. For thermo-photovoltaic, one side would be photo-emissive and the other side photosensitive. Electrical connections 165 and 166 provide a means to connect electrically to an electrical load or power supply. Wire connections 172 provide a means to connect individual pairs of electrodes in series or in parallel or a combination of series and parallel that would best match the load or supply. In the illustration of FIG. 22, all the electrode pairs are connected in series.

Figure 23:
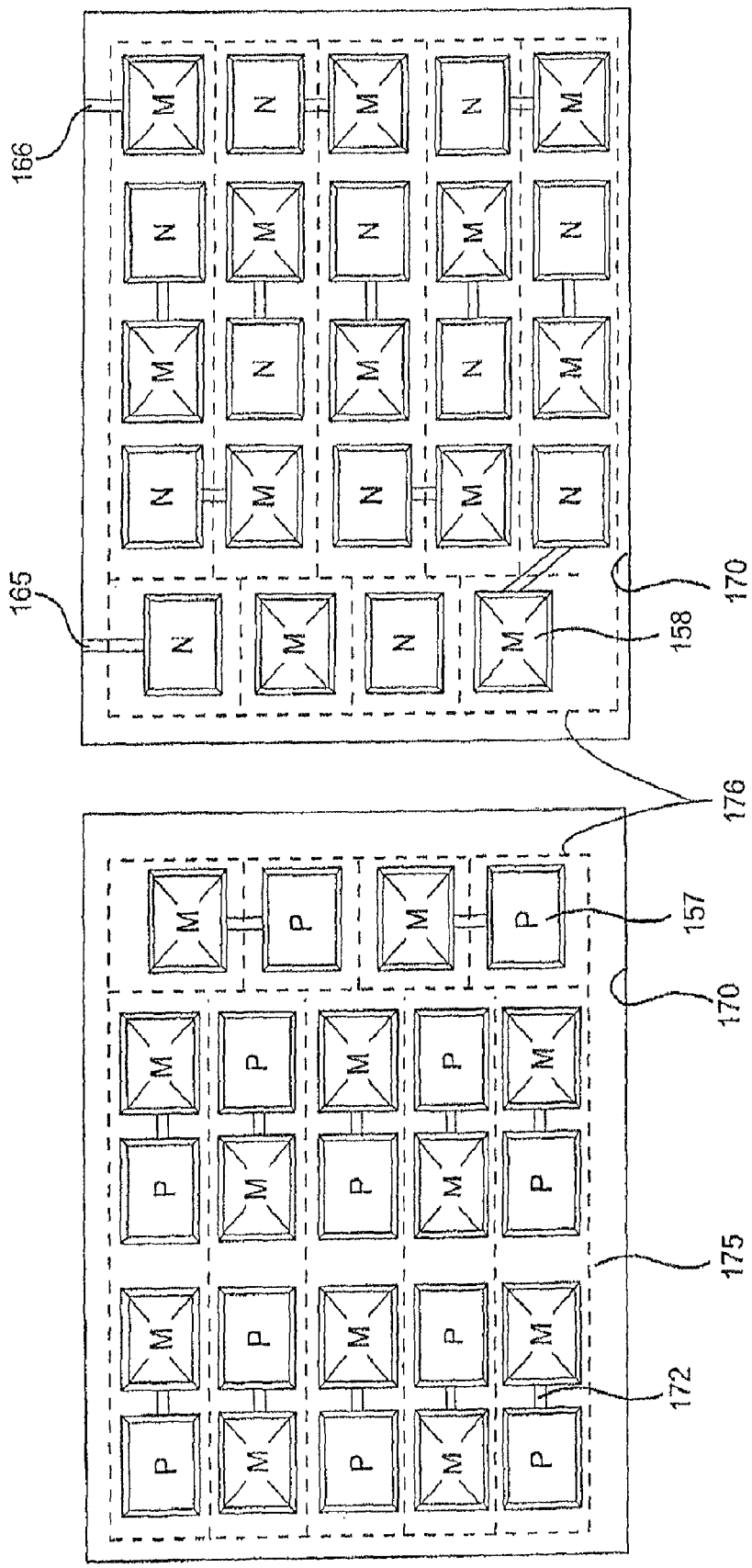

Because the silicon wafer is a prevalent substrate for electronic circuits that are mass-produced today, FIG. 23 shows how individual devices can be aggregated onto a silicon wafer. In order to allow individual electrodes to bend independently of surrounding electrodes, dashed lines 176 indicate where trenches are cut in the back of the wafer. These trenches are intended be bending points for the thermal expansion movement, but still retain enough rigidity for the wafer to serve as a top or bottom of a vacuum chamber. The trench also reduces the electrical interference with neighboring electrodes, as can selectively not doping the silicon at and near the dashed lines 176. The use of a silicon wafer in this manner also allows the film stacks shown in FIG. 15 to be built upon the wafers in FIG. 23.

Example 11

Measurements for Curved Design with and without Thermal Bending Force

A cooling device was built as shown in FIG. 15a with 1.0 square cm electrodes 157 and 158, and whose behavior is illustrated is FIG. 18. The metal layer 150 was brass and its thickness was 0.25 mm; the semiconductor layer 154 was silicon with a thickness of 0.27 mm and was doped to achieve a resistivity of 0.003 ohm-cm; the adhesive layer 151 was solder paste melted and flowed at 400 degrees C.; the silicon-metal adhesive layer 155 and 153 was Titanium with a thickness of 20 nm; the gap facing layer 156 was 20 nm gold film on one side and 20 nm gold film with a 30 nm Bismuth thermoelectrically sensitive layer facing the gap. Bismuth is known to have a Seebeck coefficient of 90 microvolts per degree Celsius. The supports 164 in FIG. 18 were made of DuPont Kapton™ polyimide with a thickness of 25 microns and a cross sectional area of approximately 0.25 mm on each of the four corners between square electrodes 157 and 158 in FIG. 15a. This assembly was then placed between spring-loaded holders in a vacuum chamber pumped down to 0.001 Torr. Applying a voltage of 0.245 volts between the two electrodes heated the assembly to 27° C. above ambient, and resulted in a current flow of 0.8 amps. A nanometer gap was hypothesized to have been formed because only 0.014 volts were required earlier to produce 0.8 amps while the electrodes were known to be in contact at ambient temperature. The additional voltage is believed to be the voltage across the nanometer vacuum gap. After placing thermocouples to each backside of the two electrodes, a temperature swing of 9.6° C. was observed every time the polarity of the voltage and current were reversed. When the electrodes were in contact, a temperature swing of only 0.13° C. was observed. Hence, the presence of the gap increased the temperature swing 74 times.

It should be emphasized that the above-described embodiments of the present device and process, particularly, and "preferred" embodiments, are merely possible examples of implementations and merely set forth for a clear understanding of the principles of the invention. Many different embodiments of the self-positioning electrode device described herein may be designed and/or fabricated without departing from the spirit and scope of the invention. All such modifications and variations are intended to be included herein within the scope of this disclosure and protected by the following claims. Therefore the scope of the invention is not intended to be limited except as indicated in the appended claims.

I claim:

1. A device comprising a pair of facing electrodes or electrode assemblies wherein an attracting force distribution within the electrodes or electrode assemblies and an equal but opposite repelling force distributions act simultaneously to establish a stable equilibrium separation of the two electrodes across all or part of their facing surfaces said device further including an electrical circuit that generates a gap-forming start-up current in the device creating a separation that can sustain a temperature difference between the two electrodes or electrode assemblies until the electron tunneling current can take over as the gap-creating current.

2. The device of claim 1, wherein at least one attracting or repelling force distribution is created and maintained during normal operation of the device by the native current distribution, voltage distribution, or temperature distribution, or any combination of these.

3. The device of claim 1, wherein an additional force from a distribution of springs or spongy material offsets deficiencies or excesses in the magnitude of said attracting and repelling forces.

4. The device of claim 1, wherein one or both of the facing electrodes is/are created from an array of cantilevered structures fabricated from a combination of film growth and sacrificial layer removal on standard industry substrates.

5. The device of claim 1, wherein a low work-function layer is formed by including Cesium or Barium or a combination of Cesium and Barium in a vacuum package which creates a vapor that forms a monolayer, submonolayer, or multiple monolayers on one or both of the facing electrodes.

6. The device of claim 5, wherein a compound of an alkali metal selected from the group consisting of Cesium Chromate and a Bismuth-Cesium alloy, is attached to a filament that creates the presence of the alkali metal inside the container through heating, evaporation, and condensation.

7. The device of claim 6, wherein the electrodes or electrode assemblies include doped silicon sides and the filament includes connectors that are electrically routed through the doped silicon sides to eliminate wire holes and feed-throughs, and further wherein the filament is connected in parallel electrically with the device and is designed to open its circuit after the alkali metal is evaporated.

8. The device of claim 1, including a material that acts a getter to remove unwanted gases at the time of production or subsequently.

9. The device of claim 1, wherein the electrodes are arranged in multiple spaced layers.

10. A device comprising multiple units of the device of claim 1, assembled in series or in parallel.

11. A device comprising multiple units of the device of claim 1, fabricated on a wafer or stack of wafers to achieve production efficiency or packaging density or a combination of production efficiency and packaging density.

12. A device comprising multiple units of the device of claim 1, wherein the electrodes are placed on smaller heat sinks that are all connected to a larger heat sink that accumulates the heat flow into or out of multiple devices.

13. A device comprising multiple units of the device of claim 1, wherein the electrodes or electrode assemblies are contained in an evacuated container with two thermal paths leading into and out of the container.

14. The device of claim 13, wherein the separating material of the two thermal paths is a material selected from the group consisting of glass, ceramic, and another material with low thermal conductivity.

15. The device of claim 14, wherein the container is formed of walls made of glass and the thermal paths are silicon and, the walls and thermal paths are bonded together using a glass fit process to form the vacuum seal.

16. The device of claim 1, including multiple permanent magnets and permeable ferromagnetic materials arranged to have voids containing a magnetic field that allows gaps to form in individual devices when they are turned on and have a current flowing.

17. The device of claim 1, wherein at least one of the electrode faces has a curved shape.

18. The device of claim 17, wherein the facing electrodes are atomically smooth.

19. The device of claim 17, wherein the electrodes are enclosed in a vacuum chamber, or in a chamber filled with inert gas, preferably argon or nitrogen.

20. The device of claim 17, wherein in the curved shape is selected to achieve a small contact area at a center point and a larger area surrounding the center point for electron tunneling or photon tunneling or phonon blocking or any combination of these.

21. The device of claim 20,
wherein an area surrounding the center point achieves a gap of 0.5 to 1 nanometer for thermal isolation by blocking phonon transfer or electron tunneling or a combination of these.

22. The device of claim 17, wherein contact between the two electrodes is prevented by a separating force.

23. A device comprising multiple units of the device of claim 22, including multiple permanent magnets and permeable ferromagnetic materials arranged to have voids containing a magnetic field that allows gaps between facing electrodes to form in individual devices when they are turned on and have a current flowing.

24. The device of claim 22, wherein the separating force is a thermal expansion force acting on one or both of the electrodes, from heating or cooling of parts of the device during operation, from an external heating or cooling source.

25. The device of claim 24, wherein thermal expansion acts against a support outside of the tunneling and phonon-blocking areas, and wherein the support preferably is in contact with both electrodes or both electrode assemblies, and further wherein the support preferably is in direct contact with one facing electrode or electrode assembly and not in direct contact with the other facing electrode or electrode assembly.

26. The device of claim 17, wherein the electrodes or electrode assemblies are configured to also be tops and bottoms of a vacuum chamber.

27. The device of claim 22, wherein the separating force is configured to reduce or remove one or more of a group of potential interactions between the electrodes or electrode assemblies, including: the thermal conduction due to phonon transfer, the thermal conduction due to electron transfer, the thermal conduction due to radiation transfer, or the electrical conduction of electrons below the Fermi energy level, or any combination of these.

28. The device of claim 22, further including a mechanically, magnetically, electrostatically, electromechanically, or electromagnetically created additional force offsetting deficiencies or excesses in the magnitude of said attracting and separating forces.

29. The device of claim 17, wherein the electrode or electrode assembly has a layer facing the other electrode or electrode assembly, said layer having a high Seebeck or Peltier coefficient to facilitate thermoelectric effects.

30. The device of claim 17, wherein one electrode has a photo-emissive layer and the other electrode has a photosensitive layer to facilitate thermo-photovoltaic effects.

31. The device of claim 17, wherein multiple electrode pairs are connected in series or parallel or a combination of series and parallel to facilitate voltage matching with the load or power supply.

32. A process for converting thermal energy to an electrical current or for converting electrical energy to refrigeration comprising exposing a device of claim 1 to a magnetic field and a current distribution or temperature distribution, and adjusting strength of the magnetic field and the current distribution or the temperature distribution to place the facing electrodes in a stable, spaced apart, equilibrium position.

33. The process of claim 32,
wherein the facing electrodes are spaced apart in the range of about 20 nanometers or less.

34. A process for converting heat to cooling or to electrical energy comprising supplying the device of claim 17, and subjecting the device to a temperature difference from a heat source.

35. The process of claim 34, wherein the heat source is selected from the group consisting of a radiation source, heat from the environment, geothermal energy, heat generated from an engine, and heat generated from animal metabolism.

36. The process of claim 34, wherein the heat source is selected from the group consisting of a running electrical, steam or internal combustion engine, burning fuel, exhaust gases from burning fuel, an internal combustion engine, and exhaust gases from an internal combustion engine and the device is incorporated in the engine or gas exhaust line as a heat sink.

37. The process of claim 34,
wherein the device is operated at naturally occurring temperatures.

38. The process of claim 34, wherein multiple units of the device are assembled in series, or in parallel.

39. The device of claim 8, wherein the getter material is selected from the group consisting of titanium, cesium, barium, sodium, potassium, and a combination thereof.

40. A device according to claim 12, wherein the smaller heat sinks comprise fins running in a different planar direction from and connected to the larger heat sink.

41. The device of claim 13, wherein the thermal path material is made of silicon, copper, aluminum or other material with high thermal conductivity.

42. The device of claim 14, wherein the silicon forming the thermal paths comprises highly doped silicon which allows electrical connections to the electrodes to flow through the silicon and eliminates the need for wire holes, feed-throughs, or other connections to the interior of the container.

43. The device of claim 14, wherein the container walls and the thermal paths are bonded together by a soft thermal material with sufficient thermal conductivity, to allow slight movement of the electrodes while simultaneously conducting heat to or from the electrodes.

44. The device of claim 43, wherein the soft thermal material comprises a material selected from the group consisting of a liquid metal, a silicon-free polymer, a mixture containing carbon nano-tubes, a vacuum compatible grease, and a suspension of thermally conductive particles in a soft or liquid material.

45. The device of claim 15, wherein the connecting wire to the electrode or electrode assembly is attached with solder, solder bumps, ultrasonic wire bonding, conductive epoxy, solder paste, or contact pressure.

46. The device of claim 16, wherein the permanent magnets are placed inside of a grating formed from permeable magnetic material to create an array of devices with a side for heat to flow into the array and a side for heat to flow out of the array.

47. The device of claim 20, wherein the permanent magnet and/or permeable magnetic material is one of or an alloy of or a recombined sintering of a material selected from the group consisting of iron, cobalt, nickel, chromium, platinum, aluminum, and neodymium.

48. The device of claim 20, wherein an area surrounding the center point achieves a gap of 1 to 10 nanometers for thermo-tunneling of hot electrons.

49. The device of claim 20, wherein an area surrounding the center point achieves a gap of 10 to 100 nanometers for thermo-photovoltaic photon tunneling.

50. The device of claim 20, wherein the curved shape is achieved via bonding of two materials of differing thermal expansion characteristics.

51. The device of claim 50, wherein the two materials are a semiconductor material, a thermoelectrically sensitive material or a photovoltaically sensitive material, and a metal.

52. The device of claim 51, wherein the semiconductor material is selected from the group consisting of silicon, gallium arsenide, silicon carbide, germanium and tellurium.

53. The device of claim 51, wherein the thermoelectrically sensitive material is doped or undoped bismuth telluride.

54. The device of claim 17, wherein the separating force is a Lorentz force created by current flowing in the electrode or electrode assembly in combination with an applied magnetic field.

55. The device of claim 17, further including a permanent magnet mounted on or near either electrode.

56. The device of claim 55, wherein the permanent magnet contains conducting ferromagnetic magnetic materials in any combination of iron, cobalt, nickel, neodymium, and aluminum.

57. The device of claim 23, wherein the permanent magnets are placed inside of a grating formed from permeable magnetic material to create an array of devices with a side for heat to flow into the array and a side for heat to flow out of the array.

58. The device of claim 54, wherein a compound of an alkali metal is attached to a filament that creates the presence of the alkali metal inside the container through heating, evaporation, and condensation.

59. The device of claim 58, wherein the filament connectors are electrically routed through the doped silicon thermal top and bottom to eliminate wire holes and feed-throughs.

60. The device of claim 17, wherein the electrode or electrode assembly has a layer facing the other electrode or electrode assembly, said layer having a low work function material or resonant tunneling thickness to facilitate thermo-tunneling effects, wherein the low work function material comprises a layer of a alkali metal, an alloy of an alkali metal, an oxide, diamond, or nanotubes.

61. The device of claim 17, wherein the pairs of electrode or electrode assemblies are mounted to or built upon two substrates.

62. The device of claim 17, wherein the substrate is also a vacuum chamber and the substrate and contains vacuum-compatible materials.

63. The device of claim 62, wherein the vacuum-compatible materials include at least one of a group of materials selected from the group consisting of silicon, polyimide and glass, and a combination thereof.

64. The device of claim 62, wherein the electrode pairs are combined separately to form their own vacuum chambers, and these pairs are mounted using printed circuit board techniques.

65. The process of claim 32, wherein the strengths of the magnetic field and the current distribution are adjusted to place the facing electrodes in a stable, spaced apart, equilibrium position spaced in the range of 1 nanometer to 20 nanometers.

66. The process of claim 32, wherein the strengths produce an electrode spacing in the range of 20 nanometers to 1000 nanometers and one electrode has a photosensitive material for use in radiation conversion to electric power by primarily photon thermo-tunneling from the radiating electrode to the other photosensitive electrode.

67. The process of claim 32, wherein the strengths produce an electrode spacing in the range of 20 nanometers to 100 nanometers.

68. The process of claim 34, wherein the device is used in a refrigerator, an air conditioner, a cooling blanket, cooling clothing, or a cooling device attached to or contained within a human or animal body.

69. The process of claim 34, wherein the electrodes are arranged in multiple layers of periodic spacing.

70. The process of claim 34, wherein multiple units of the device are fabricated on a wafer or stack of wafers to achieve production efficiency or packaging density or a combination or production efficiency and packaging density.

* * * * *